US009819805B2

United States Patent
Feldt et al.

(10) Patent No.: US 9,819,805 B2
(45) Date of Patent: Nov. 14, 2017

(54) COMMUNICATION DEVICE WITH ECHO SUPPRESSION

(71) Applicant: Sennheiser Communications A/S, Ballerup (DK)

(72) Inventors: Svend Feldt, Ballerup (DK); Adam Dyrby, Ballerup (DK); Stig Petri, Smørum (DK)

(73) Assignee: SENNHEISER COMMUNICATIONS A/S, Ballerup (DK)

( * ) Notice: Subject to any disclaimer, the term of this patent is extended or adjusted under 35 U.S.C. 154(b) by 504 days.

(21) Appl. No.: 14/323,577

(22) Filed: Jul. 3, 2014

(65) Prior Publication Data

US 2015/0011266 A1    Jan. 8, 2015

(30) Foreign Application Priority Data

Jul. 5, 2013 (EP) ..................... 13175235

(51) Int. Cl.
*H04M 9/08* (2006.01)
*H04B 3/21* (2006.01)

(52) U.S. Cl.
CPC ............. *H04M 9/082* (2013.01); *H04B 3/21* (2013.01); *H04M 9/087* (2013.01)

(58) Field of Classification Search
CPC .......... H04M 9/082; H04M 9/087; H04B 3/21
See application file for complete search history.

(56) References Cited

U.S. PATENT DOCUMENTS

| 3,175,051 A | 3/1965 | Cutler |
| 3,622,714 A | 11/1971 | Berkley et al. |
| 5,386,465 A * | 1/1995 | Addeo ................. H04M 9/087 379/202.01 |

(Continued)

FOREIGN PATENT DOCUMENTS

| EP | 1367566 A2 | 12/2003 |
| WO | WO 98/28893 A1 | 7/1998 |
| WO | WO 2007/006658 A1 | 1/2007 |

OTHER PUBLICATIONS

European Search Report for EP 13175235.4 dated Oct. 18, 2013.

*Primary Examiner* — Joseph Dean, Jr.
(74) *Attorney, Agent, or Firm* — Birch, Stewart, Kolasch & Birch, LLP

(57) ABSTRACT

The application relates to a communication device, e.g. a speakerphone, comprising a microphone signal path, MSP, and a loudspeaker signal path, SSP, the microphone signal path comprising a microphone unit, an MSP-filter, and a transmitter unit operationally connected to each other and configured to transmit a processed signal originating from an input sound picked up by the microphone, the loudspeaker signal path comprising a receiver unit, an SSP-filter, and a loudspeaker unit operationally connected to each other and configured to provide an acoustic sound signal originating from a signal received by the receiver unit. The communication device comprises a control unit for dynamically controlling the filtering characteristics of the MSP and SSP-filters based on one or more control input signals. This has the advantage of providing a simple and flexible scheme for decreasing echo in a communication device, while ensuring an acceptable sound quality in the transmitted signal.

21 Claims, 17 Drawing Sheets

(56) References Cited

U.S. PATENT DOCUMENTS

| | | | |
|---|---|---|---|
| 2006/0182268 A1* | 8/2006 | Marton | H04M 9/082 379/406.08 |
| 2010/0215184 A1* | 8/2010 | Buck | H04M 9/082 381/66 |
| 2013/0083931 A1* | 4/2013 | Higure | H04B 1/1638 381/56 |

* cited by examiner

COMMUNICATION DEVICE WITH ECHO SUPPRESSION

TECHNICAL FIELD

The present application relates to telecommunications, e.g. teleconferencing. The disclosure relates specifically to a communication device and to the minimization of echo and feedback. The application furthermore relates to the use of a communication device and a method of operating a communication device.

The application further relates to a data processing system comprising a processor and program code means for causing the processor to perform steps of the method.

Embodiments of the disclosure may e.g. be useful in applications such as handsfree telephone systems, mobile telephones, teleconferencing systems, public address systems, karaoke systems, classroom amplification systems, etc.

BACKGROUND

Several different feedback or echo problems can occur in a telephone system comprising two geographically separated handsets with a network comprising a transmission line between them. A signal loop comprising acoustic as well as electric transmission paths from one station to the other and back may be established via feedback from loudspeaker to microphone of each handset, so that e.g. the speech from a first talker at one end picked up by the microphone of the handset and transmitted to a handset at the other end, where acoustic feedback from the loudspeaker to the microphone of the handset occurs, may result in a component of the speech of the first talker returns to the loudspeaker of the first talker's handset as an echo. This situation is schematically illustrated in FIG. 1 (compare original speech element 1: Hello with echo element 6: Hello). Other echo problems may, alternatively, be of purely electric origin due to transmission line reflections or equivalent.

U.S. Pat. No. 3,622,714 describes the use of complementary comb filters in telephonic transmission to minimize such echo problems. FIG. 3 of U.S. Pat. No. 3,622,714 illustrates a system comprising telephone stations (C, D) each comprising complementary filters (30, 31) and (32, 33), respectively. The complementary filters used in the receive parts (comprising speakers 35, 36, respectively) and the transmit parts (comprising microphones 34, 37, respectively) of each station are illustrated in FIG. 2 of U.S. Pat. No. 3,622,714. Filters $f_{15}$-$f_{25}$ and $f_{16}$-$f_{26}$ each represent a comb filter with a passband width and a center-frequency spacing of each passband of one third octave (i.e. a non-uniform width of the frequency bands).

SUMMARY

An object of the present application is to provide an alternative scheme for controlling echo suppression in a communication device, e.g. a speakerphone.

In its broadest aspect the present application deals with a communication device comprising a microphone signal path, and a loudspeaker signal path—both comprising a signal processing unit for processing signals of the respective paths—and a control unit for controlling the signal processing unit(s) in dependence of detector units and/or inputs to the control unit. Typically, a part of the processing of the signal paths is performed in the frequency domain. Typically a part of the processing of the control unit is performed in the frequency domain. Preferably, the control unit is configured to identify a specific echo suppression mode of operation of the communication device (e.g. on a time-frequency unit basis), wherein a complementary filtering strategy is applied in the microphone and loudspeaker signal paths.

Objects of the application are achieved by the invention described in the accompanying claims and as described in the following.

A Communication Device:

In an aspect of the present application, an object of the application is achieved by a communication device comprising a microphone signal path, termed MSP, and a loudspeaker signal path, termed SSP, the microphone signal path comprising a microphone unit, an MSP-signal processing unit comprising an MSP-filter, and a transmitter unit operationally connected to each other and configured to transmit a processed signal originating from an input sound picked up by the microphone, the loudspeaker signal path comprising a receiver unit, an SSP-signal processing unit comprising an SSP-filter, and a loudspeaker unit operationally connected to each other and configured to provide an acoustic sound signal originating from a signal received by the receiver unit, wherein the communication device comprises a control unit for dynamically controlling the filtering characteristics of the MSP and SSP-filters based on one or more control input signals.

This has the advantage of providing a simple and flexible scheme for decreasing echo in a communication device, while ensuring an acceptable sound quality in the transmitted signal.

In an embodiment, the microphone signal path and/or the loudspeaker signal path comprise(s) an analysis filter bank for converting a time domain input signal to a number of time varying signals in the frequency domain. In an embodiment, the microphone signal path and/or the loudspeaker signal path comprise(s) a synthesis filter bank for converting a number of time varying frequency domain input signals to a time domain signal.

In an embodiment, the control unit is configured to activate or de-activate a specific echo suppression mode of operation of the communication device.

In an embodiment, the MSP- and SSP-filters—in said particular echo suppression mode of operation—are configured to have essentially complementary filtering characteristics.

In an embodiment, the MSP-filter and SSP-filter are digital filters each comprising a number of passbands $PB_i$ centered around predefined pass-band center frequencies $f_{PBc,i}$=1, 2, . . . , $N_{PB}$, the passbands being separated by stopbands $SB_j$ centered around predefined stop-band center frequencies $f_{SBc,j}$, j=1, 2, . . . , $N_{SB}$, where $N_{PB}$ and $N_{SB}$ are the number of passbands and stopbands, respectively.

In an embodiment, an analogue electric signal representing an acoustic signal is converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_s$ of bits, $N_s$ being e.g. in the range from 1 to 16 bits. A digital sample x has a length in time of $1/f_s$, e.g. 50 µs, for $f_s$=20 kHz. In an embodiment, a number of audio samples are arranged in a time frame. In an embodiment, a time frame comprises 64 or 128 audio data samples. Other frame lengths may be used depending on the practical application. A frame length may e.g. be of the order of 2 to 20 ms, e.g. 3.2 ms or 3.75 ms (e.g. Bluetooth) or 5 ms or 7.5 ms (e.g. Bluetooth) 10 ms (e.g. DECT).

In an embodiment, the communication devices comprise an analogue-to-digital (AD) converter to digitize an analogue input with a predefined sampling rate, e.g. 20 kHz. In an embodiment, the communication devices comprise a digital-to-analogue (DA) converter to convert a digital signal to an analogue output signal, e.g. for being presented to a user via an output transducer, e.g. the loudspeaker unit.

In an embodiment, the communication device, e.g. the microphone unit, and or a transceiver unit (e.g. the receiver unit) comprise(s) a TF-conversion unit for providing a time-frequency representation of an input signal. In an embodiment, the time-frequency representation comprises an array or map of corresponding complex or real values of the signal in question in a particular time and frequency range. In an embodiment, the TF conversion unit comprises a filter bank for filtering a (time varying) input signal and providing a number of (time varying) output signals each comprising a distinct frequency range of the input signal. In an embodiment, the TF conversion unit comprises a Fourier transformation unit for converting a time variant input signal to a (time variant) signal in the frequency domain. In an embodiment, the frequency range considered by the communication device from a minimum frequency $f_{min}$ to a maximum frequency $f_{max}$ comprises a part of the typical human audible frequency range from 20 Hz to 20 kHz, e.g. a part of the range from 20 Hz to 12 kHz, e.g. including a range of a normal telephone line channel, e.g. from 300 Hz to 3.4 kHz. In an embodiment, a signal of the forward and/or analysis path of the communication device is split into a number NI of frequency bands, where NI is e.g. larger than 5, such as larger than 10, such as larger than 50, such as larger than 100, such as larger than 500, at least some of which are processed individually. In an embodiment, the communication device is/are adapted to process a signal of the forward and/or analysis path in a number NP of different frequency channels (NP≤NI). The frequency channels may be uniform or non-uniform in width (e.g. increasing in width with frequency), overlapping or non-overlapping.

In an embodiment, the characteristics of the MSP-filter comprises MSP pass-band center frequencies $f_{MSP,PBc,i}$ and MSP stop-band center frequencies $f_{MSP,SBc,j}$, and the characteristics of the SSP-filter correspondingly comprises SSP pass-band center frequencies $f_{SSP,PBc,i}$ and SSP stop-band center frequencies $f_{SSP,SBc,j}$. In an embodiment, the MSP pass-band center frequencies $f_{MSP,PBc,j}$ are essentially equal to the SSP stop-band center frequencies $f_{SSP,SBc,j}$, and the MSP stop-band center frequencies $f_{MSP,SBc,j}$ are essentially equal to the SSP pass-band center frequencies $f_{SSP,PBc,i}$.

The term 'complementary filtering characteristics' is in the present context taken to imply that only some frequency bands are played in the loudspeaker signal path, and that these bands are filtered out (or at least attenuated) in the microphone signal path.

In an embodiment, the MSP-signal processing unit comprises a synthesizing unit for providing signal content at frequencies of the signal of the MSP-signal path filtered out by the MSP-filter. WO 2007/006658 A1 describes a method of eliminating feedback using filtering and subsequent synthesis of filtered out frequency bands, e.g. based on interpolation of the envelope of the 'remaining signal'. Bandwidth extension methods, e.g. Spectral Band Replication (SBR), are e.g. described in EP 1367566 A2.

In an embodiment, the filtering characteristics of the MSP and SSP-filters comprise parameters such as center frequencies, 3 dB bandwidths and/or gains of the stop and passbands. In an embodiment the bandwidths of all passbands are equal. In an embodiment the bandwidths of all stopbands are equal. In an embodiment, passbands and stopbands are equal in bandwidth. In an embodiment corresponding passbands and stopbands are arranged in pairs which are equal in bandwidth (but possibly different from the bandwidth of passbands and stopbands of a neighbouring passband-stopband pair). In an embodiment, the bandwidths of the passband-stopband pairs are equal on a logarithmic scale (i.e. increasing in width with increasing frequency).

In a particular embodiment, the communication device, e.g. the control unit, is adapted to provide that at least some of, preferably a majority of, such as all of the passbands and stopbands are arranged in pairs according to critical bands as defined by auditory perception theory (i=1, 2, . . . , N), see e.g. B. C. J. Moore, 'An Introduction to the Psychology of Hearing', Elsevier Academic Press, 2004, Chapter 3. By ensuring that the combined frequency range of a passband-stopband pair occur within a critical band (see e.g. FIG. 3B, where each passband-stopband pair constitutes one critical band (the separation of critical bands being indicated by vertical, dashed lines in FIG. 3B), one can ensure that a given desired signal power is present within each critical band while still avoiding feedback/echo problems. In a crude model of the auditory system, the exact distribution of energy within each critical band is less important for perceptual quality, as long as the total amount of energy within each critical band is correct.

In an embodiment, the filtering characteristics of the MSP-filter and/or the SSP-filter are configurable dependent of a property of a signal of the microphone signal path and/or a signal of the loudspeaker signal path. In an embodiment, the property is related to the frequency spectrum of the MSP signal and/or the frequency spectrum of the SSP signal.

In an embodiment, the communication device comprises a frequency analyzing unit configured to determine a power spectrum of a signal of the forward path, the power spectrum being e.g. represented by a power spectral density, PSD(k), k being frequency index, the total power of the power spectrum at a given point in time m being determined by a sum or integral of PSD(k) over all frequencies at the given point in time). In an embodiment, the frequency analyzing unit is configured to determine a probability density function of the energy (magnitude squared, $|\cdot|^2$) at a given frequency (k) and time (m) of a signal of a the loudspeaker and/or microphone path of the communication device based on a number of previous time frames, e.g. corresponding to a sliding window (e.g. the $N_f$ previous time frames relative to a given (e.g. present) time frame).

In an embodiment, the SSP-signal processing unit comprises a gain unit for compensating the energy content filtered out of the signal by the SSP-filter. In an embodiment, the gain applied to a given frequency (pass-) band is adapted to provide that the total amount of energy of the passband after amplification in the gain unit substantially corresponds to the energy of the stopband-passband pair (constituted by the passband in question and its adjacent stopband, e.g. corresponding to a critical band) before filtering in the SSP-filter.

In an embodiment, the control unit is configured to control the synthesizing unit. In an embodiment, the control unit is configured to control the gain unit.

In an embodiment, the complementary filtering characteristics of the MSP- and SSP-filters are limited to specific frequency bands. In an embodiment, the specific frequency bands are preselected or dynamically controlled by the control unit.

In an embodiment, the control input signals comprise a signal from the frequency analyzing unit.

In an embodiment, the control input signals comprise a signal indicative of a property of a signal of the microphone signal path and/or a signal of the loudspeaker signal path.

The communication device comprises an acoustic (and/or mechanical) feedback (echo) suppression system. Acoustic feedback occurs because the output loudspeaker signal from an audio system providing amplification of a signal picked up by a microphone is partly returned to the microphone via an acoustic coupling through the air or other media, e.g. a transmission line and another communication device. The part of the loudspeaker signal returned to the microphone (e.g. via a network and feedback in another communication device) is then re-amplified by the system before it is represented at the loudspeaker, as an echo. In extreme cases where this cycle is allowed to continue, the effect of acoustic feedback becomes audible as artifacts or even worse, howling, when the system becomes unstable. Some classic situations with feedback problems are telephony, public address systems, headsets, audio conference systems, hearing assistance devices, etc. Adaptive feedback cancellation has the ability to track feedback path changes over time. Such techniques are commonly used in hearing assistance devices, e.g. hearing instruments, where a signal path of the device comprises microphone amplifier and loudspeaker in very close proximity of each other, telephones, teleconferencing systems (e.g. speakerphones), public address systems, etc. In a communication device according to the present disclosure (located at a 'near end') connected via a telephone network to another communication device (located at a 'far' or 'remote end'), feedback may occur from the loudspeaker to the microphone of one or both communication devices and an echo of a signal having traveled to a far end and back via the network may survive and present an annoyance to users.

In an embodiment, the communication device comprises a feedback estimation unit for estimating a current value of (near end) feedback from the loudspeaker to the microphone of the communication device. In an embodiment, the feedback estimation unit comprises an adaptive filter.

In an embodiment, the communication device comprises a feedback path change detector configured to detect significant changes in the feedback path. Preferably, the feedback change detector provides a measure FBM of the change of the feedback path estimate from one time instance (n−1) to the next (n). In an embodiment, the measure is based on the energy content E(•) of the feedback estimate FBE, e.g. FBM(n)=E(FBE(n))−E(FBE(n−1)), (FBE=FBest in FIG. 7B). In an embodiment, the measure FBM is based on the energy content (e.g. the power spectral density) of the feedback corrected input signal, e.g. the error signal e(n) (M-INe, cf. FIG. 7B), e.g. FBM(n)=E(e(n))−E(e(n−1)). In an embodiment, the measure FBM is based on the energy content of the microphone input signal before and after feedback correction, e.g. FBM(n)=E(mic(n))−E(e(n)) (e.g. mic(n)=M-IN and e(n)=M-INe in FIG. 7B). In an embodiment, the measure FBM is based on the energy content of the feedback path estimate FBE(n) (FBest in FIG. 7B) and the raw microphone signal mic(n) (M-IN(n) in FIG. 7B).

In an embodiment, a 'near end' is defined as the location of the (first) communication device (according to the present disclosure) and a 'far end' is defined as a location of a (second) communication device with which a link is established via a network.

In an embodiment, the control unit comprises a doubletalk detector for detecting a situation where users at each end talk simultaneously and for providing a control signal indicative of that fact. In an embodiment, the one or more control input signals comprise said control signal from said doubletalk detector. In an embodiment, the control signal from said doubletalk detector is determined from a feedback change detector. In an embodiment, a change (over time) of the energy content of the feedback path from the loudspeaker to the microphone of the communication device is taken to be indicative of double talk. In an embodiment, double talk is indicated if the feedback measure FBM is larger than a predefined threshold $FBM_{th}$.

In an embodiment, the control signal from the doubletalk detector is determined from a comparison of a) the current energy of the far end signal (e.g. represented by the energy content of the feedback path from the loudspeaker to the microphone of the communication device) with b) the current energy content of the near end signal taken in relation to the current energy in the far end signal (e.g. represented by the energy content microphone input signal and energy content of the speaker signal or filtered speaker signal). In an embodiment, double talk is indicated when the energy content of the near end and far end signals is significant at the same time.

In an embodiment, the control signal from the doubletalk detector is determined from a comparison of a) the current energy of the far end signal represented by the energy content of the loudspeaker signal with b) the current energy content of b1) the near end signal represented by the energy content microphone input signal taken in relation to b2) the current energy in the far end signal represented by the energy content of the speaker signal or an estimate of the speaker signal filtered through the feedback path from the loudspeaker to the microphone.

In an embodiment, the activation or de-activation of the echo suppression mode is determined based on the indication of the amount of double talk detected. In an embodiment, the control unit is configured for dynamically controlling the filtering characteristics of the MSP and SSP-filters based on the current amount of double talk, e.g. as indicated by the size of the feedback measure.

In an embodiment, the microphone signal path comprises a squelch unit for limiting a signal of the microphone signal path in dependence of a signal level in the speaker signal path.

In an embodiment, a squelch unit of the microphone signal path is configured to limit a signal of the microphone signal path in the time domain. In an embodiment, the attenuation is based on an estimate of the change (over time) of the energy content of the feedback path from the loudspeaker to the microphone of the communication device.

In an embodiment, a squelch unit of the microphone signal path is configured to limit a signal of the microphone signal path in the time-frequency domain. The time-frequency based squelch algorithm is a noise reduction algorithm working in the frequency domain. The algorithm requires two input signals, one which is mostly speech and one which is mostly noise. The algorithm basically compares the energy in the two input signals and depending on the energy ratio, provides an attenuation factor, which is low if the energy ratio is high (more energy in the mostly speech signal), and high if the energy ratio is low. In an embodiment, the time-frequency domain squelch is determined by comparison of the energy content of the feedback path from the loudspeaker to the microphone of the communication device (e.g. FBestF in FIG. 7C) and the energy content of the feedback corrected microphone input signal (e.g. M-INeF in FIG. 7C) on a time-frequency unit basis.

In an embodiment, the communication device comprises a speakerphone. A speakerphone is e.g. configured to provide (handsfree) audio teleconferencing capability between one or more people in the vicinity of the speakerphone and one or more people located elsewhere and equipped with communication devices (e.g. telephone handsets or speaker phone(s)) connected with the speakerphone in question via a network (e.g. a telephone network)).

In an embodiment, the communication device comprises a local energy source (e.g. a battery, such as a rechargeable battery) for energizing components of the communications device for a certain amount of time.

In an embodiment, the communication device comprises a multitude of (wired or wireless) audio interfaces to other devices (said other devices being capable of receiving (sinking) as well as forwarding (sourcing) audio signals. In an embodiment, 'other devices' comprise e.g. a wireless telephone (e.g. a Smartphone), a computer (e.g. a PC), a headset, a hearing instrument, etc. In an embodiment, the communication device, comprises at least two (wired or wireless) audio interfaces. In an embodiment, the communication device, comprises at least one USB (audio) interface (e.g. two or more). In an embodiment, the communication device, comprises at least one phone connector or audio jack interface (e.g. two or more). In an embodiment, the communication device, comprises at least one wireless audio interface (e.g. based on Bluetooth, e.g. Bluetooth Low Energy, DECT, ZigBee, or other proprietary or standardized audio interfaces).

In an embodiment, the communication device comprises at least one (audio) interface to a (switched) network capable or exchanging audio signals between the communication device and another communication device, such as at least two, such as two or more audio network interfaces.

In an embodiment, the communication device comprises a wired interface to another device, which enables the establishment of a network-connection. In general, the wired connection to 'the other device' can be of any kind known in the art capable of transferring an audio signal, e.g. comprising an electric connector, e.g. any telephone jack, an USB connector, a phone connector, an audio jack connector, etc. In an embodiment, the phone connector comprises a 4 pole 3.5 mm jack cable.

In the communication device comprises a first (audio) network interface. In an embodiment, the interface to the first network comprises a telephone jack connector. In an embodiment, the telephone jack connector comprises an USB connector. In an embodiment, the interface to the first network comprises an interface to a PC connected to said first network. In an embodiment, the telephone jack connector is a connector to a fixed landline telephone connection to the PSTN (Public Switched Telephone Network) or to the Internet (e.g. for establishing Internet telephony based on digital packet switched VoIP connections).

In an embodiment, the communication device comprises a second (audio) network interface. In an embodiment, the interface to the second network comprises an interface to a wireless phone/cellular phone. In an embodiment, the interface to the second network comprises a phone connector.

In an embodiment, the communication device comprises a phone connector (audio jack) adapted for allowing two-way exchange of audio data between the communication device and another device for sourcing and sinking audio signals, e.g. a wireless telephone (e.g. a Smartphone), a computer (PC), a headset, etc.

In an embodiment, the loudspeaker signal path of the communication device comprises a mixer configured for mixing audio signals received from another audio (communication) device via a (wired or wireless) network interface (e.g. a PC, or a telephone) and/or via another (wired or wireless) audio interface (e.g. a headset) associated with the communication device. Thereby the signal fed to the loudspeaker of the communication device comprises audio signals from several different sources. This has the advantage of flexibly enabling teleconferences between participants at different locations using different audio devices and/or networks.

In an embodiment, the communication device comprises one or more activation elements, e.g. push buttons and/or a touch sensitive display, allowing the control of functions of the communication device and/or devices connected to the communication device. In an embodiment, the one or more activation elements is/are configured to allow connection (hook-off, answer call) and/or dis-connection (hook-on, terminate call) of a wired or wireless telephone connected to the communication device, e.g. via a phone connector. This feature is e.g. implemented in a similar way to the implementation of hook-off and hook-on when an external headset is connected to a wireless telephone. In an embodiment, it is implemented by shorting the microphone bias voltage for a short period (100 ms). In an embodiment, the communication device comprises a phone connector and cable (e.g. a 4 pole 3.5 mm jack cable) and is configured to allow a user to take and reject an incoming call coming from a wireless telephone by using activation elements (e.g. dedicated hook button(s)) on the communication device (when the phone connector is connected to the wireless telephone (cellphone)). In an embodiment, the communication device comprises an activation element allowing a user to control the volume of the loudspeaker output.

In an embodiment, the communication device is configured to prevent a sound of an activation of an activation element (e.g. a click from a button or key) from being transmitted to a far end receiver. In an embodiment, a signal processing unit of the communication device is configured to provide an interrupt on any activation of an activation element of the communication device (e.g. a push on a button). This makes it possible to mute the audio impulse form the mechanic sound for an appropriate time (thereby preventing a 'click' to reach the microphone) so that it is not transmitted to a far end device/listener.

In an embodiment, the communication device comprises a rechargeable battery and a charge connector and is adapted to charge the rechargeable battery via the charge connector. In an embodiment, the charge connector comprises a USB connector. In an embodiment, the charge connector comprises the telephone jack connector, e.g. the USB connector or a phone connector.

In an embodiment, the control unit is configured to control the charging current for charging the rechargeable battery in dependence of the current level of a signal of the speaker signal path (preferably of the current of the signal supplied to the loudspeaker unit). Preferably, the charging current is reduced with increasing current of the loudspeaker path (e.g. when the current to the loudspeaker is above a predefined threshold level, e.g. linearly or in steps). In an embodiment, the charging current $I_{cha}$ for charging the rechargeable battery is determined as $I_{cha}=\mathrm{MAX}\{(I_{cha,max}-I_{spk,req}), 0\}$, where $I_{cha,max}$ is the maximum allowed charging current (e.g. determined by the connection to the charging device) and where $I_{spk,req}$ is the currently necessary current allowing the communication device to provide a requested output volume of the loudspeaker. In an embodiment, the charging current $I_{cha}$ is reduced to zero when the current to the loudspeaker is above a predefined threshold level.

In an embodiment, the communication device is intended to be powered solely by the battery during normal operation (when the battery is not being charged).

In an embodiment, the communication device comprises a housing enclosing the components of the device, including the battery, and comprising (at is outer surface) said activation element(s) and said connector(s) to audio and/or network interfaces.

The communication device comprises an input transducer, e.g. a microphone unit (e.g. comprising an omni-directional or a directional microphone), for converting an input sound to an electric input signal. In an embodiment, the communication device comprises a directional microphone system (comprising a weighted combination of signals from a multitude of microphones) adapted to enhance a target acoustic source among a multitude of acoustic sources in the local environment of the communication device. In an embodiment, the directional system is adapted to detect (such as adaptively detect) from which direction a particular part of the microphone signal originates. This (so-called beam-forming) can be achieved in various different ways as e.g. described in the prior art. In an embodiment, the communication device comprises a multitude of microphones, preferably located in the housing or at the surface of the housing to provide good conditions for picking up sound from audio sources (e.g. different persons speaking) distributed around the device. In an embodiment, the communication device comprises a mixer for mixing (e.g. adding) the signals from the multitude of (distributed) microphones.

In an embodiment, the communication device comprises an antenna and transceiver circuitry for wirelessly communicating a direct electric signal from/to another device, e.g. another communication device, e.g. a telephone apparatus, e.g. cellular telephone apparatus, e.g. a Smartphone, thereby establishing said second network interface (or an additional network interface). In an embodiment, the communication device comprises antenna and transceiver circuitry for wirelessly communicating with another device, e.g. a hearing assistance device, such other device being thereby directly connected to the communication device according to the present disclosure. In an embodiment, the direct electric input signal represents or comprises an audio signal and/or a control signal and/or an information signal.

In general, a wireless link established by antenna and transceiver circuitry of the communication device can be of any type. In an embodiment, the wireless link is a link based on near-field communication, e.g. an inductive link based on an inductive coupling between antenna coils of transmitter and receiver parts. In another embodiment, the wireless link is based on far-field, electromagnetic radiation. In an embodiment, the communication via the wireless link is arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying) or QAM (quadrature amplitude modulation).

In an embodiment, the signal processing unit of the microphone signal path and/or of the speaker signal path is/are adapted to provide a frequency dependent gain. In an embodiment, the communication device comprises an analysis path comprising functional components for analyzing a signal of the microphone signal path and/or of the speaker signal path (e.g. determining a level, a modulation, a type of signal, an acoustic feedback estimate, etc.). In an embodiment, some or all signal processing of the analysis path and/or the signal path is conducted in the frequency domain. In an embodiment, some or all signal processing of the analysis path and/or the signal path is conducted in the time domain. In an embodiment, some signal processing of the analysis path and/or the signal path is conducted in the frequency domain and some in the time domain.

In an embodiment, the communication device comprises a level detector (LD) for determining the level of an input signal (e.g. on a band level and/or of the full (wide band) signal). In an embodiment, the control unit comprises such level detector for determining a current level of a signal of the microphone and/or speaker signal path(s), or receives a control input signal from such level detectors.

In a particular embodiment, the audio processing device comprises a voice activity detector (VAD) for determining whether or not an input signal comprises a voice signal (at a given point in time). This has the advantage that time segments of the electric microphone signal comprising human utterances (e.g. speech) in the user's environment can be identified, and thus separated from time segments only comprising other sound sources (e.g. naturally or artificially generated noise, e.g. wind noise or microphone noise).

In an embodiment, the audio processing device comprises a signal to noise ratio detector (estimator). SNR estimation may e.g. be performed in combination with a voice activity detector (VAD), as indicated above.

In an embodiment, the communication device further comprises other relevant functionality for the application in question, e.g. compression, noise reduction, etc.

In an embodiment, the communication device comprises a multitude of loudspeakers, e.g. two or more, such as three or more. In an embodiment, the communication device comprises one or more connectors allowing the connection of one or more additional loudspeakers to distribute the output sound to more units.

In an embodiment, the communication device comprises a telephone apparatus, e.g. a speakerphone. In an embodiment, the communication device comprises a headset, an earphone, an ear protection device or a combination thereof.

Use:

In an aspect, use of a communication device as described above, in the 'detailed description of embodiments' and in the claims, is moreover provided. In an embodiment, use is provided in a system comprising audio distribution, e.g. a system comprising a microphone and a loudspeaker in sufficiently close proximity of each other and/or otherwise coupled to cause feedback from the loudspeaker to the microphone during operation. In an embodiment, use is provided in a system comprising a communication device coupled to a network for exchanging audio signals with a communication device at another location. In an embodiment, use is provided in a system comprising a handsfree telephone system, a teleconferencing system, a public address system, a karaoke system, a classroom amplification system, etc.

A Method:

In an aspect, a method operating a communication device, the communication device comprising a microphone signal path, termed MSP, and a loudspeaker signal path, termed SSP, the microphone signal path comprising a microphone unit, an MSP-signal processing unit comprising an MSP-filter, and a transmitter unit operationally connected to each other and configured to transmit a processed signal originating from an input sound picked up by the microphone, the loudspeaker signal path comprising a receiver unit, an SSP-signal processing unit comprising an SSP-filter, and a loudspeaker unit operationally connected to each other and configured to provide an acoustic signal originating from a signal received by the receiver unit is furthermore provided by the present application. The method comprises dynamically controlling the filtering characteristics of the MSP and SSP-filters based on one or more control input signals.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

In an embodiment, the method comprises providing a particular echo suppression mode of operation of the communication device; and configuring the MSP- and SP-filters to have essentially complementary filtering characteristics when the of the communication device is in the echo suppression mode of operation.

In an embodiment, the method comprises synthesizing signal content at frequencies of the signal of the MSP-signal path filtered out by the MSP-filter when the communication device is in the echo suppression mode of operation.

a Computer Readable Medium:

In an aspect, a tangible computer-readable medium storing a computer program comprising program code means for causing a data processing system to perform at least some (such as a majority or all) of the steps of the method described above, in the 'detailed description of embodiments' and in the claims, when said computer program is executed on the data processing system is furthermore provided by the present application. In addition to being stored on a tangible medium such as diskettes, CD-ROM-, DVD-, or hard disk media, or any other machine readable medium, and used when read directly from such tangible media, the computer program can also be transmitted via a transmission medium such as a wired or wireless link or a network, e.g. the Internet, and loaded into a data processing system for being executed at a location different from that of the tangible medium.

a Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

Further objects of the application are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element or intervening elements may be present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The disclosure will be explained more fully below in connection with a preferred embodiment and with reference to the drawings in which.

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

Figure 1:
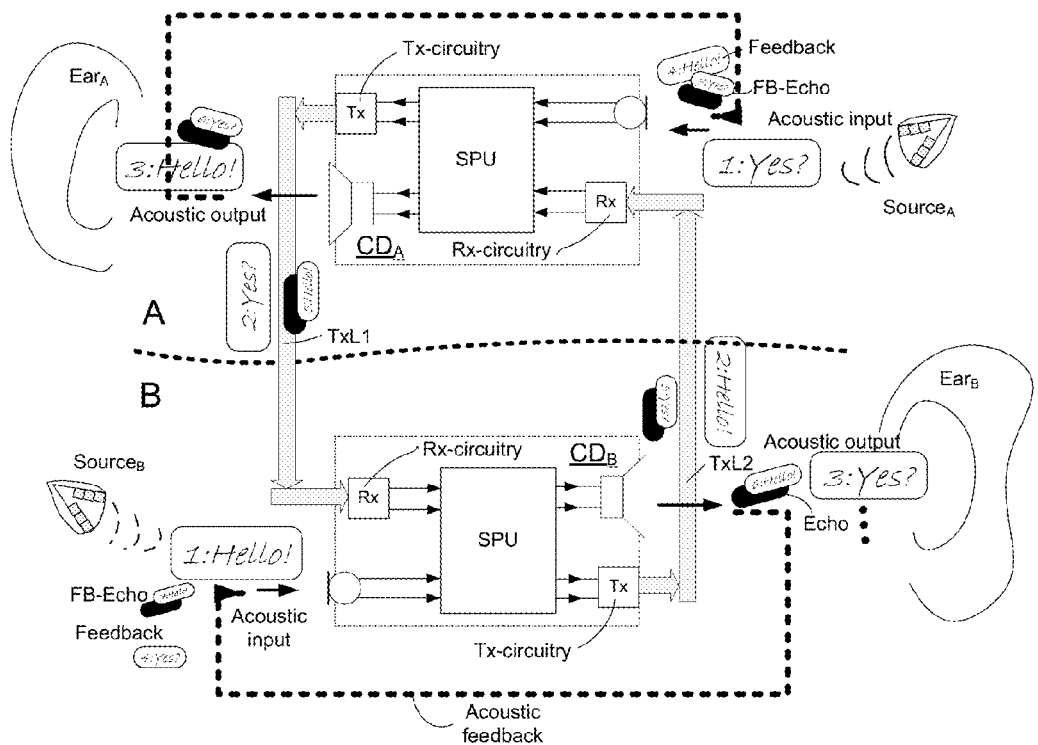
FIG. 1 schematically shows possible echo problems in a telephone system comprising two geographically separated telephone handsets communicating audio signals via a network.

FIG. 1 shows possible echo problems in a telephone system comprising two geographically separated telephone handsets communicating audio signals via a network. FIG. 1 schematically illustrates a telephone system comprising two geographically separated communication devices (e.g. telephone handsets and/or speakerphones) ($CD_A$, $CD_B$) in audio communication with each other via a network comprising a transmission line between them (TxL1, TxL2). A signal loop comprising acoustic as well as electric transmission paths from one station (A) to the other (B) and back may be established via feedback (dashed arrow denoted Acoustic feedback) from loudspeaker to microphone of each handset, so that e.g. the speech (1: Hello) from a first talker ($Source_B$) at one end (B) picked up by the microphone of the handset ($CD_B$) and transmitted to a handset ($CD_A$) at the other end (A), where if acoustic feedback from the loudspeaker to the microphone of the handset ($CD_A$) occurs, may result in a feedback component of the speech (5: Hello) of the first talker ($Source_B$) returns to the loudspeaker of the first talker's handset ($CD_B$) as an echo (6: Hello, indicated in the drawings, here FIG. 1, by a shadowing to represent an echo). Alternatively or additionally echo problems of purely electric origin due to transmission line reflections or equivalent may be present. The path from the second talker ($Source_A$) at station A represented by speech element 1: Yes is also illustrated in FIG. 1. Each handset ($CD_A$, $CD_B$) comprises separate microphone and loudspeaker signal paths as is normally the case in a telephone apparatus or headset or speakerphone. The microphone paths each comprises a microphone unit for picking up a sound signal (e.g. 1: Hello or 1: Yes) and converting it to an electric input signal, a signal processing unit (SPU) for processing the electric input signal and providing a processed signal, and a transmission unit (TX, Tx-circuitry) for transmitting the processed signal to a loudspeaker signal path of a far end handset. Correspondingly, the loudspeaker paths each comprises a receiver unit (Rx, Rx-circuitry) for receiving an electric input signal representative of a sound (e.g. 2: Hello or 2: Yes) from a microphone signal path of a far end handset, a signal processing unit (SPU) for processing the electric input signal and providing a processed signal, and a loudspeaker unit for converting the processed signal to an output sound (e.g. 3: Hello or 3: Yes). Each talker is schematically represented by a mouth ($Source_A$, $Source_B$) and each listener by an ear ($Ear_A$, $Ear_B$), respectively. Talker and listener may or may not be the same physical person.

Figure 2:
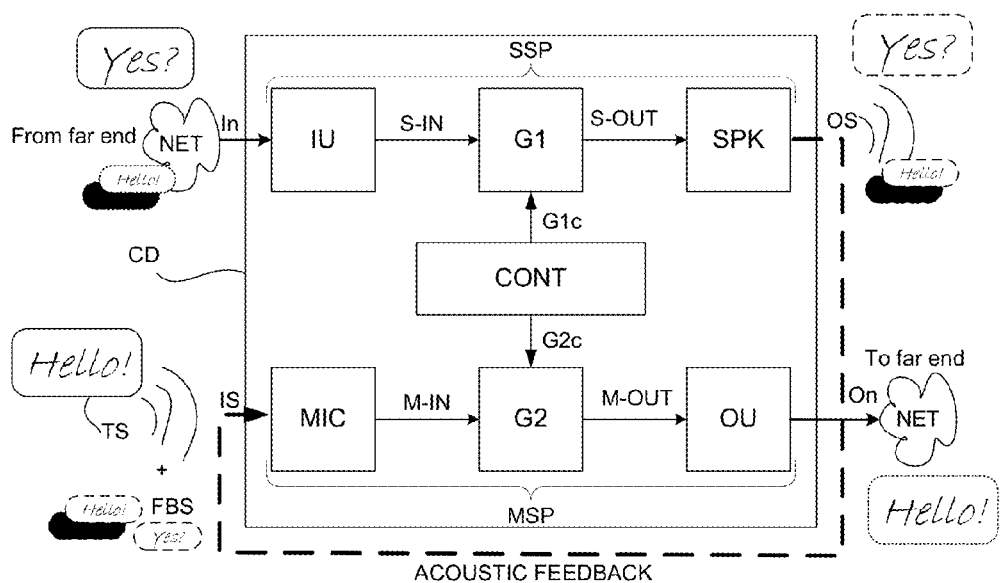
FIG. 2 shows an exemplary speech and echo/feedback situation in an embodiment of a communication device according to the present disclosure.

FIG. 2 shows an exemplary speech and echo/feedback situation in an embodiment of a communication device according to the present disclosure. The communication device of FIG. 2 comprises a loudspeaker signal path (SSP), a microphone signal path (MSP), and a control unit (CONT) for dynamically controlling signal processing of the two signal paths. The loudspeaker signal path (SSP) comprises a receiver unit (IU) for receiving an electric signal (In) from a remote end and providing it as an electric received input signal (S-IN), an SSP-signal processing unit (G1) comprising a digital (SSP-) filter for processing the electric received input signal (S-IN) and providing a processed output signal (S-OUT), and a loudspeaker unit (SPK) operationally connected to each other and configured to convert the processed output signal (S-OUT) to an acoustic sound signal (OS) originating from the signal (In) received by the receiver unit (IU). The microphone signal path (MSP) comprises a microphone unit (MIC) for converting an acoustic input sound (IS) to an electric microphone input signal (M-IN), an MSP-signal processing unit (G2) comprising an MSP-filter for processing the electric microphone input signal (M-IN) and providing a processed output signal (M-OUT), and a transmitter unit (OU) operationally connected to each other and configured to transmit the processed signal (M-OUT) originating from an input sound (IS) picked up by the microphone unit (MIC) to a remote end as a transmitted signal (On). The control unit (CONT) is configured to dynamically control the processing of the SSP- and MSP-signal processing units (G1 and G2, respectively), including the filtering characteristics of the MSP- and SSP-filters (via control signals G1c and G2c, respectively) based on one or more control input signals (not shown in FIG. 2). In the speech and echo/feedback situation illustrated by FIG. 2, the loudspeaker signal path (SSP) of the communication device (CD) receives (via a network (NET)) an input signal (In) representing a speech element (Yes?) from a remote (far end) device (From far end), possibly mixed with an echo of a speech element (Hello!) transmitted to the far end device by the (near end) communication device (CD) in question. The received input signal (In→S-IN) is processed in signal processing unit (G1) and provided as an output sound (OS) comprising a modified version of input (target) speech element (Yes?) and (possibly mixed with) input (echo) speech element (Hello!) (the modification being indicated by the dashed line enclosing the speech elements). The output sound (OS) is propagated as a feedback signal (FBS) via a feedback path (indicated with dashed arrow denoted ACOUSTIC FEEDBACK in FIG. 2) to the microphone unit (MIC) of the microphone signal path (MSP), where it is mixed with target sound element (TS, Hello!) to provide the input sound (IS) picked up by the microphone unit (MIC). The electric microphone input signal (M-IN) originating from input sound (IS) is processed in signal processing unit (G2) and provided as a signal (On) transmitted to a remote end (To far end) via a network (NET), the transmitted signal comprising a modified version of input (target) speech element (Hello) and (possibly mixed with) input (echo/feedback) speech elements (Hello!/Yes?).

The input signals (S-IN, M-IN) to the communication device (CD) may be presented in the (time-) frequency domain or converted from the time domain to the (time-) frequency domain by appropriate functional units, e.g. included in input unit (IU) and microphone unit (MIC) of the communication device. A communication device according to the present disclosure may e.g. comprise a multitude of time to time time-frequency conversion units (e.g. one for each input signal that is not otherwise provided in a time-frequency representation, cf. e.g. analysis filter bank units (A-FB) of FIG. 7C) to provide each input signal $X_i(k,m)$ (i=1, 2, . . . , N) in a number of frequency bands k and a number of time instances m (the entity (k,m) being defined by corresponding values of indices k and m being termed a TF-bin or DFT-bin or TF-unit, cf. e.g. FIG. 8B).

Figure 3A:
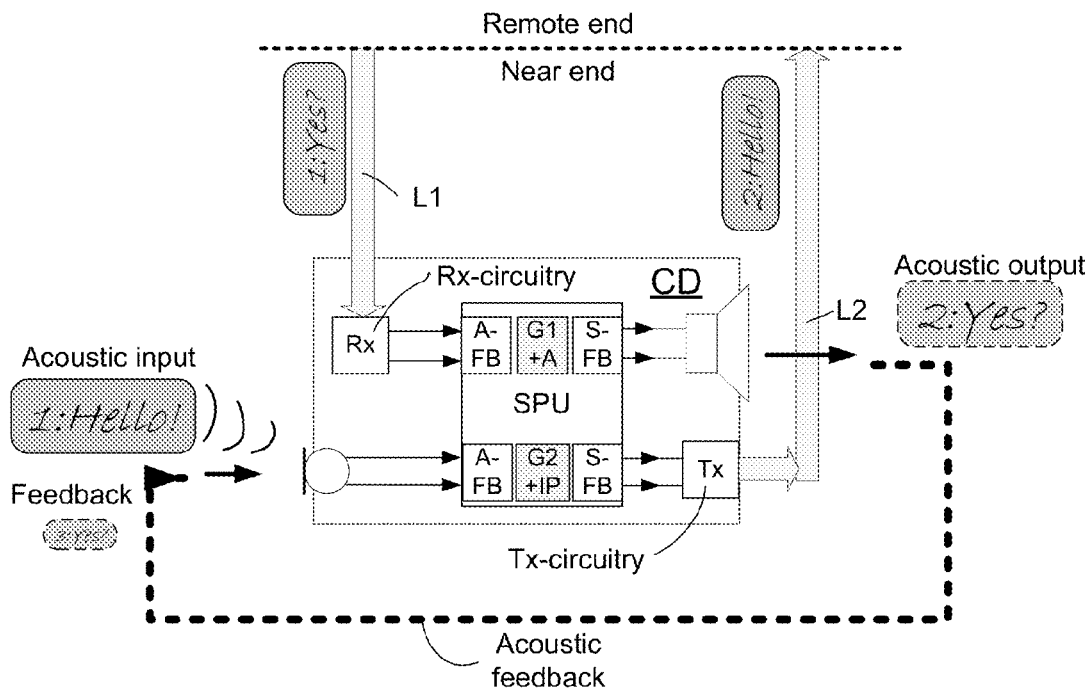
FIG. 3 shows an exemplary speech and echo/feedback situation in an embodiment of a communication device according to the present disclosure (FIG. 3A) and—in a specific double talk mode—exemplary complementary filter characteristics of the filters of the speaker and microphone signal paths, respectively (FIG. 3B)
Figure 3B:
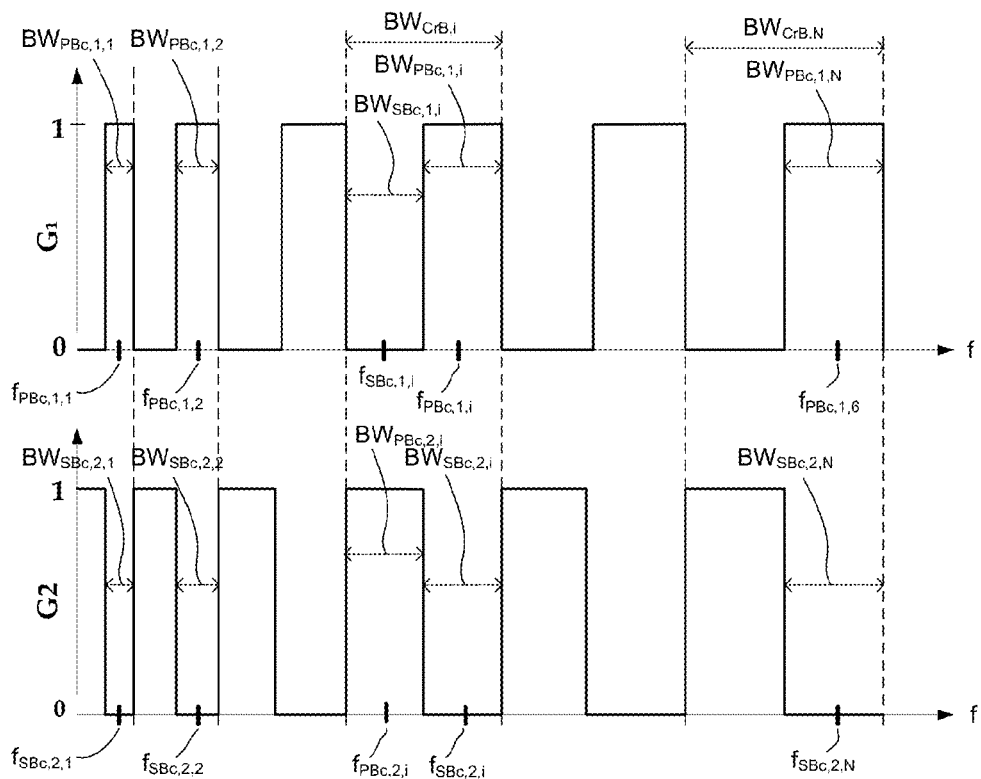

FIG. 3 shows an exemplary speech and echo/feedback situation in an embodiment of a communication device according to the present disclosure (FIG. 3A) and—in a specific double talk mode—exemplary complementary filter characteristics of the filters of the speaker and microphone signal paths, respectively (FIG. 3B).

FIG. 3A illustrates the same speech and feedback situation as discussed in connection with FIG. 2. The communication device (CD) is located at a near end location (Near end) and in communication with a communication device at a far end location (Far end) via a network comprising transmission lines (L1, L2). The loudspeaker and microphone signal paths each comprises analysis filter banks (A-FB) to provide input signals in the time-frequency domain. Signal processing units (G1+A and G2+IP) of the loudspeaker and microphone signal paths, respectively, is thus performed in a number of frequency bands. Hence, the loudspeaker and microphone signal paths each comprise synthesis filter banks (S-FB) to provide output signals in the time domain before being fed to a speaker unit and transmission units (Tx, Tx-circuitry), respectively. The signal processing unit (G1+A) of the loudspeaker signal paths comprises in addition to a controllable SSP-filter a gain unit for compensating the energy content filtered out of the signal by the SSP-filter. Similarly, the signal processing unit (G2+IP) of the microphone signal path comprises in addition to a controllable MSP-filter a synthesizing unit for providing signal content at frequencies of the signal of the MSP-signal path filtered out by the MSP-filter.

FIG. 3B shows an example of possible filter characteristics of the filters of the loudspeaker (index 1, SSP) and microphone (index 2, MSP) paths respectively. In the embodiment shown in FIG. 3B, successive passbands and stopbands are arranged in pairs, where the stop and passbands of a pair are equal in bandwidth (but different from the bandwidth of passbands and stopbands of a neighbouring passband-stopband pair). Each of the filters comprise passband and stopband center frequencies, denoted $f_{PBc,1,i}$, $f_{PBc,2,i}$, and $f_{SBc,1,i}$, $f_{SBc,2,i}$, respectively, where (i=1, 2, . . . , N), N being the number of passband-stopband-pairs. The SSP pass-band center frequencies $f_{PBc,1,i}$ are essentially equal to the MSP stop-band center frequencies $f_{SBc,2,i}$, and the SSP stop-band center frequencies $f_{SBc,1,i}$ are essentially equal to the MSP pass-band center frequencies $f_{PBc,2,i}$. In the embodiment shown in FIG. 3B, the passbands and stopbands are arranged in pairs according to critical bands as defined by auditory perception theory (i=1, 2, . . . , N), so that the combined frequency range of a passband-stopband pair lie within a critical band, the separation of critical bands being indicated by vertical dashed lines in FIG. 3B. In the embodiment shown in FIG. 3B, the combined range of the $i^{th}$ frequency passband-stopband pair ($BW_{SB,1,i}+BW_{PB,1,i}$ for the loudspeaker path, and $BW_{PB,2,i}$ $BW_{SB,2,i}$ for the microphone path, respectively) is equal to a frequency range constituted by the $i^{th}$ critical band ($BW_{CrB,i}$), i=1, 2, . . . , N. By providing that the combined frequency range of a passband-stopband pair occur within a critical band, a given desired signal power can be allocated to each critical band while still avoiding feedback/echo problems.

Figure 4A:
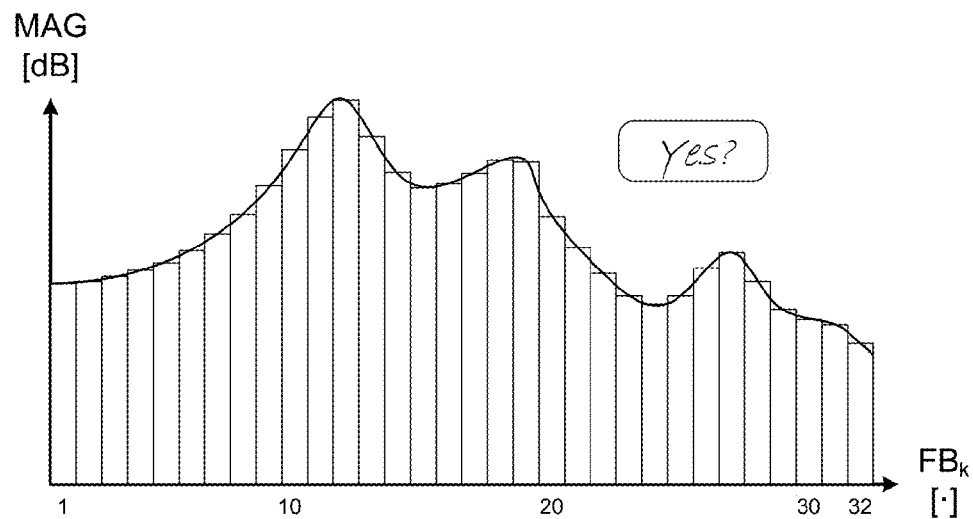
FIG. 4 shows in FIG. 4A an exemplary frequency spectrum (at a given point in time/time frame) of a first speech element (Yes?), in FIG. 4B a filtering characteristic of a first filter of a first signal path (e.g. the speaker signal path in FIG. 2), and in FIG. 4C the signal of FIG. 4A after filtering by a filter with the filtering characteristic of FIG. 4B.
Figure 4B:
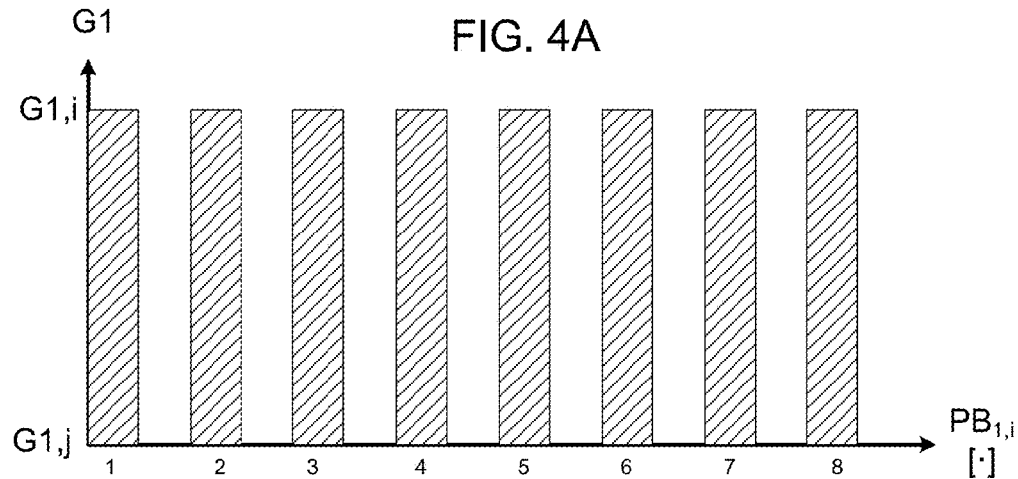
Figure 4C:
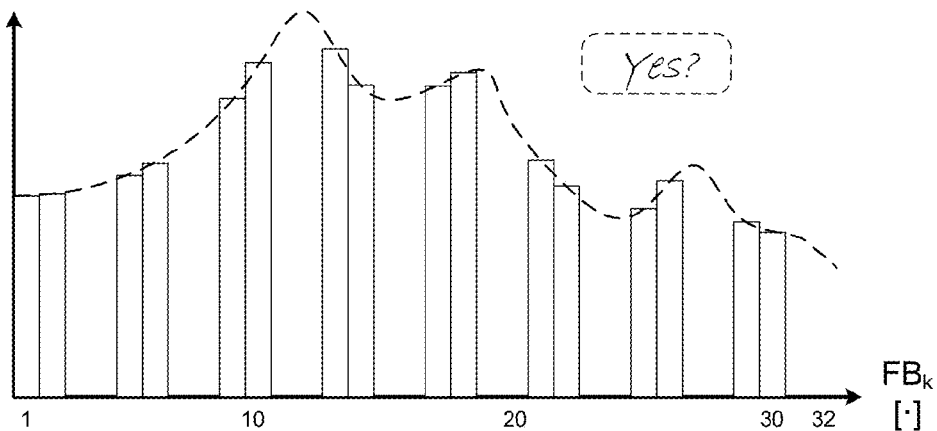

FIG. 4 shows in FIG. 4A an exemplary frequency spectrum (at a given point in time/time frame) of a first speech element (symbolically denoted Yes?), in FIG. 4B a filtering characteristic of a first filter of a first signal path (e.g. the speaker signal path (SSP) in FIG. 2), and in FIG. 4C the signal of FIG. 4A after filtering by a filter with the filtering characteristic of FIG. 4B. FIG. 4A schematically shows a frequency spectrum of a speech element at a given point in time as presented to a controllable (variable) digital filter of a speaker signal path of a communication device (e.g. unit G1 in FIG. 2 or unit G1+A in FIG. 3A). FIG. 4A may e.g. represent the output of an analysis filter bank (cf. e.g. analysis filter bank A-FB in FIG. 3B, e.g. implemented as a Discrete Fourier Transform (DFT) or other appropriate time to time-frequency transformation) at a given point in time. The graph illustrates magnitude [dB] versus frequency bin [1:32], where the relevant frequency range is mapped in 32 frequency bins (frequency index k, k=1, 2, . . . , 32) for a given time frame (time index m) (e.g. corresponding to magnitude values of the signal represented by column m of FIG. 8). FIG. 4B schematically shows an exemplary filtering characteristic of the controllable digital filter of the speaker signal path. The frequency range of interest (e.g. 20 Hz to 12 kHz) corresponding to frequency bins 1-32 in FIG. 4a is divided into 8 passbands ($PB_{1,i}$ numbered from i=1 to i=8) and 8 stopbands (index j). The attenuation in the pass and stopbands are denoted $G_{1,i}$ and $G_{1,j}$, respectively. In an ideal (normal) situation (as e.g. in an ideal digital filter), $G_{1,i}=1$, i=1, 2, . . . , 8 and $G_{1,j}=0$, j=1, 2, . . . , 8. In practice, $G_{1,i}$ and $G_{1,j}$, may deviate from their ideal values, and e.g. be (intentionally) varied over the frequency range (i.e. be different for different indices i, j). This is schematically illustrated in FIG. 9. The width bands of the exemplary digital filter is the same for all passbands and stopbands (each covering 2 frequency bins of the spectrum of FIG. 4a). This need not be the case as discussed in connection with FIG. 3 (critical bands) and FIG. 9 (width is individually configurable). FIG. 4C schematically shows the frequency spectrum of the speech element presented in FIG. 4a at a given point in time after its filtering by a digital filter having the filtering characteristics shown in FIG. 4B. The resulting (ideal, $G_{1,i}=1$, $G_{1,j}=0$, i, j=1, 2, . . . , 8) frequency spectrum of the speech element (Yes?) consequently only has content at frequencies corresponding to the passbands $PB_{1,i}$ of the (SSP-) filter.

Figure 5A:
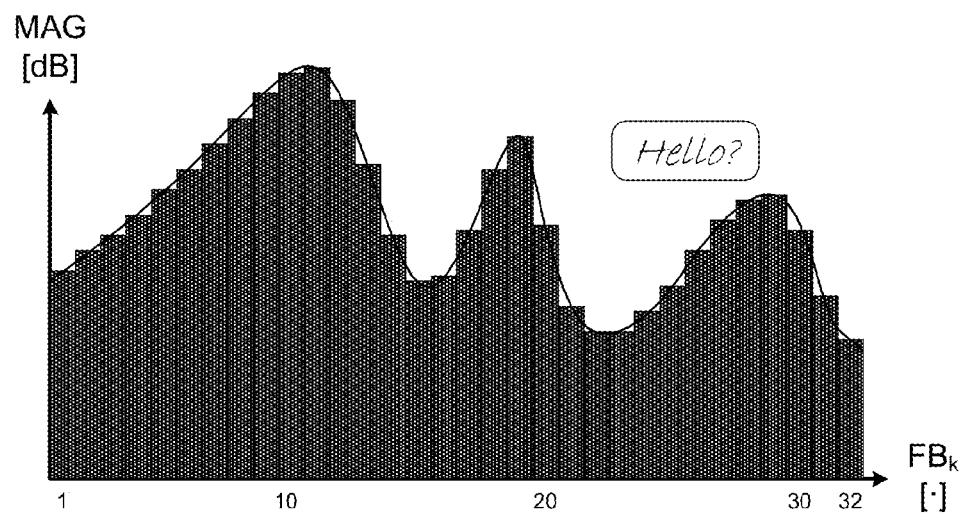
FIG. 5 shows in FIG. 5A an exemplary frequency spectrum (at a given point in time/time frame) of a second speech element (Hello?), in FIG. 5B a filtering characteristic of a second filter of a second signal path (e.g. the microphone signal path in FIG. 2), and in FIG. 5C the signal of FIG. 5A after filtering by a filter with the filtering characteristic of FIG. 5B.
Figure 5B:
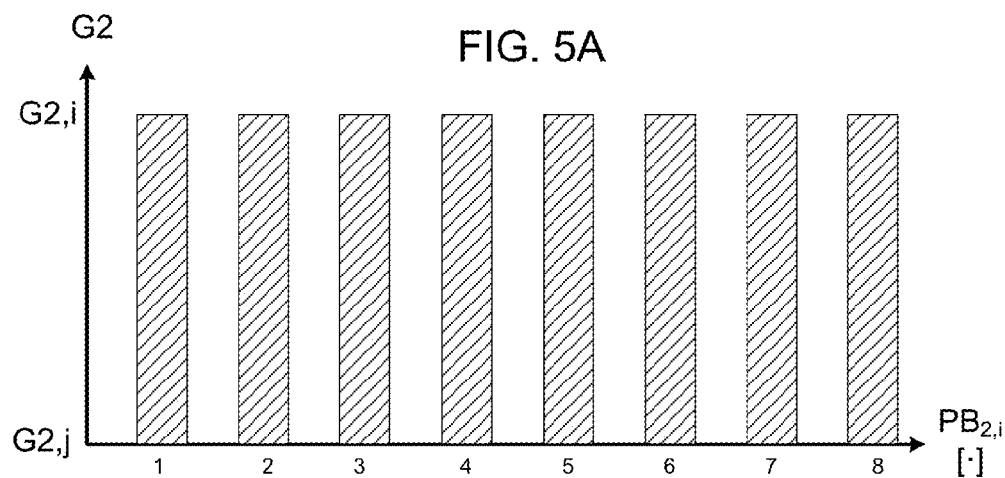
Figure 5C:
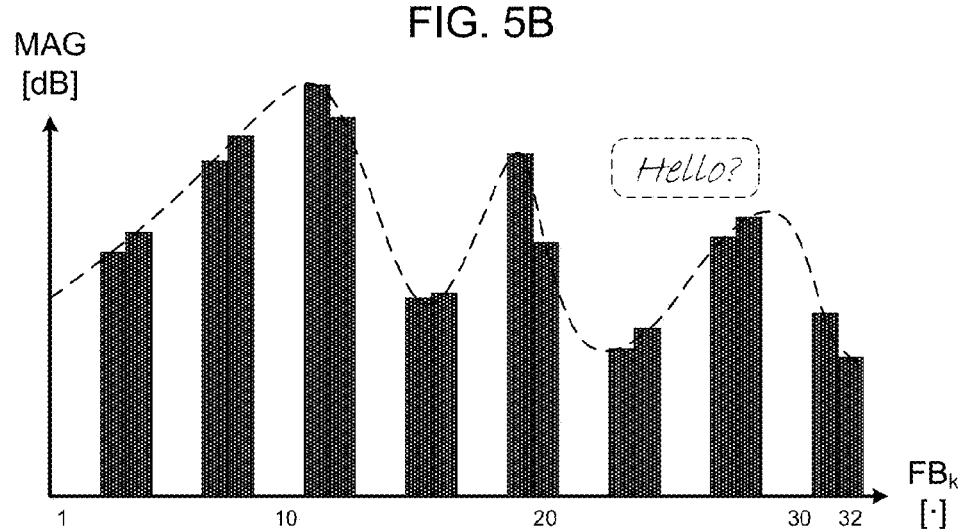

FIG. 5 shows in FIG. 5A an exemplary frequency spectrum (at a given point in time/time frame) of a second speech element (symbolically denoted Hello?), in FIG. 5B a filtering characteristic of a second filter of a second signal path (e.g. the microphone signal path (MSP) in FIG. 2), and in FIG. 5C the signal of FIG. 5A after filtering by a filter with the filtering characteristic of FIG. 5B. FIG. 5 is equivalent to FIG. 4, apart from dealing with the (complementary) filtering of an input speech element to the microphone signal path of a communication device. FIG. 5A schematically shows a frequency spectrum of a speech element at a given point in time as presented to a controllable (variable) digital filter of a speaker signal path of a communication device (e.g. unit G2 in FIG. 2 or unit G2+IP in FIG. 3A). FIG. 5B schematically shows an exemplary filtering characteristic of the controllable digital filter of the microphone signal path. FIG. 5B is equivalent to FIG. 4B, apart from the passbands and stopbands being interchanged, so that the passbands ($PB_{2,i}$) of FIG. 5B are stopbands ($SB_{1,j}$) in FIG. 4B, and vice versa ($SB_{2,j}=PB_{1,i}$, i, j=1, 2, . . . , 8), thereby together implementing a complementary filtering scheme. FIG. 5C schematically shows the frequency spectrum of the speech element presented in FIG. 5A at a given point in time after its filtering by a digital filter having the filtering characteristics shown in FIG. 5B. The resulting (ideal, $G_{1,i}=1, G_{1,j}=0$, i, j=1, 2, . . . , 8) frequency spectrum of the speech element (Hello?) consequently only has content at frequencies corresponding to the passbands $PB_{2,i}$ of the (MSP-) filter.

Figure 6A:
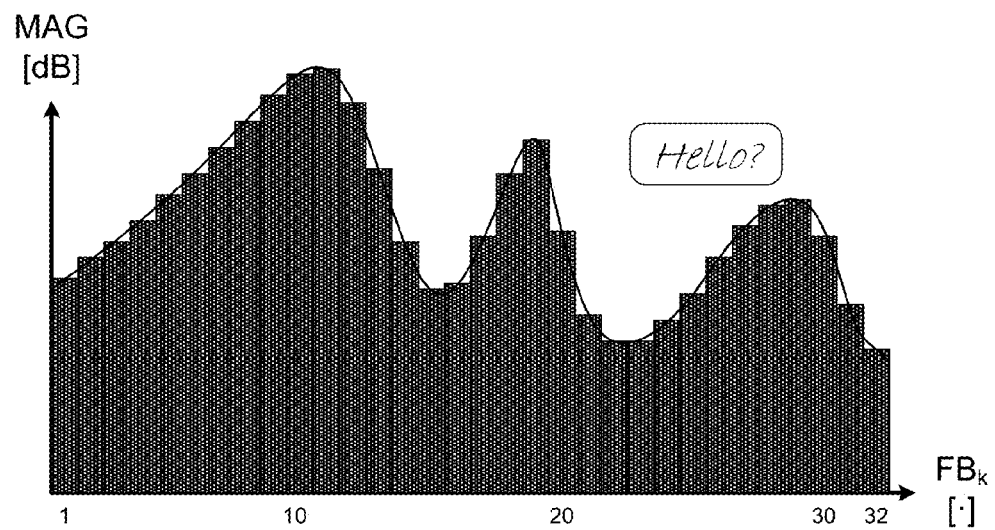
FIG. 6 shows a schematic construction of an output signal of the microphone signal path of an embodiment of a communication device according to the present invention (as e.g. shown in FIG. 2), the output of the microphone signal path being intended for transmission to a 'far end' communication device via a network, FIGS. 6A, 6B and 6C illustrating the frequency spectra of possible input signals picked up by the microphone unit, FIG. 6D showing an exemplary filtering characteristic of the MSP-filter of the microphone signal path, FIG. 6E showing the resulting output of the MSP-filter and FIG. 6F showing an exemplary synthesized (e.g. bandwidth extended) output signal of the microphone signal path.
Figure 6B:
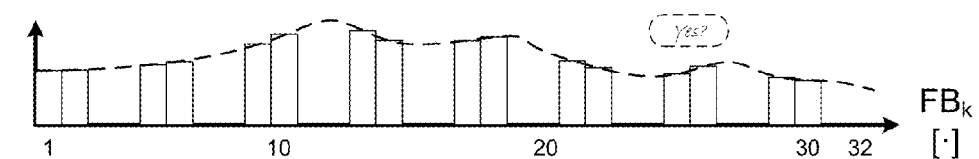
Figure 6C:
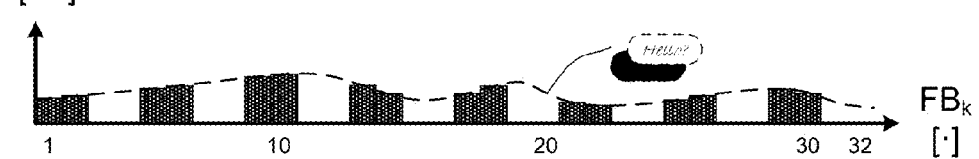
Figure 6D:
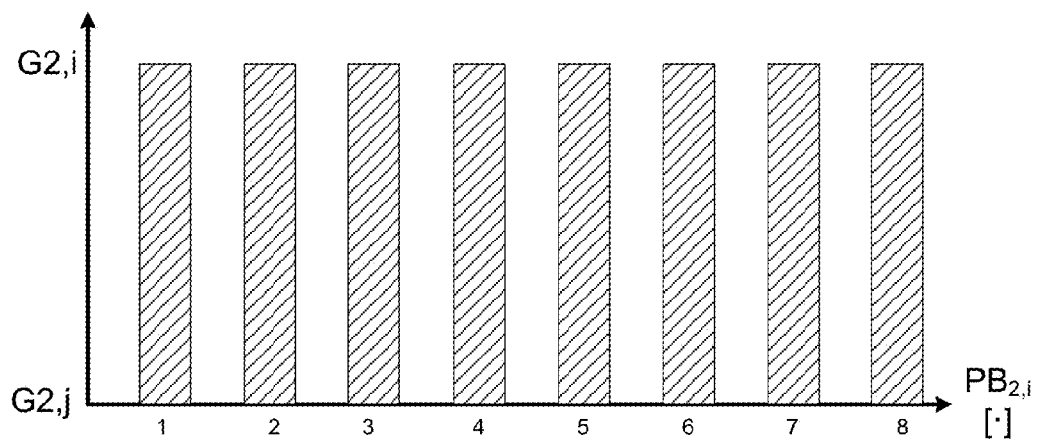
Figure 6E:
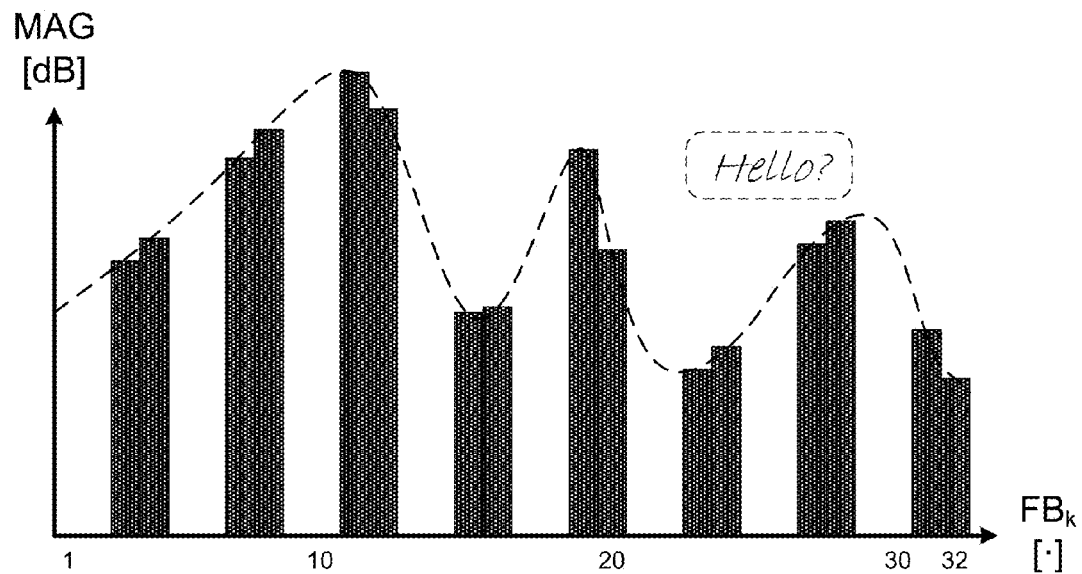
Figure 6F:
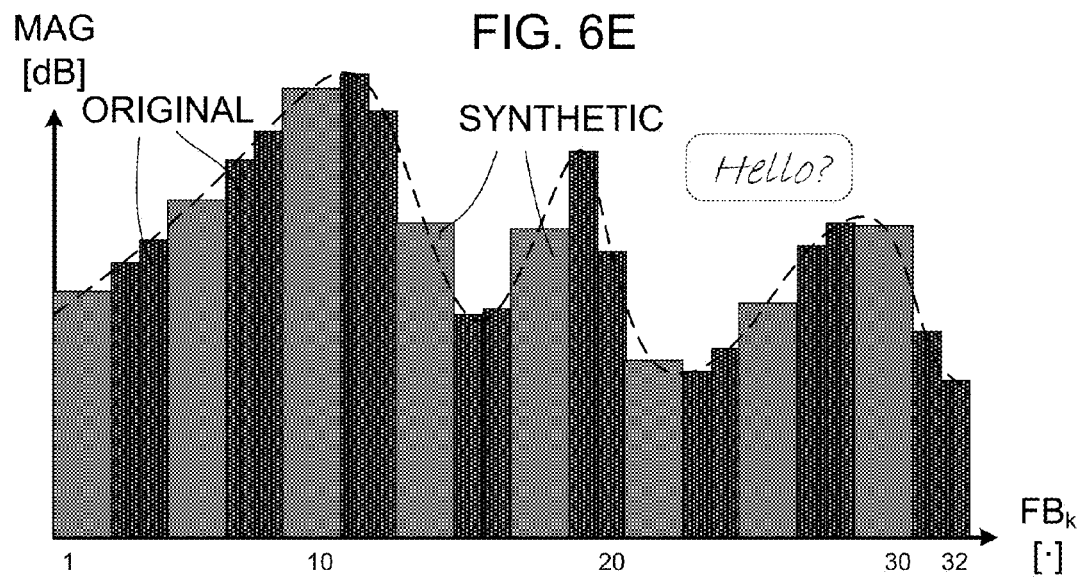

FIG. 6 shows a schematic construction of an output signal of the microphone signal path of an embodiment of a communication device according to the present invention (as e.g. shown in FIG. 2), the output of the microphone signal path being intended for transmission to a 'far end' communication device via a network, FIGS. 6a, 6B and 6C illustrating the frequency spectra of possible input signals picked up by the microphone unit, FIG. 6D showing an exemplary filtering characteristic of the MSP-filter of the microphone signal path, FIG. 6E showing the resulting output of the MSP-filter and FIG. 6F showing an exemplary synthesized (e.g. bandwidth extended) output signal of the microphone signal path.

FIG. 6 illustrates the basic idea of the complementary filtering scheme, which—in a specific echo suppression mode—is used in the MSP and SSP filters of the microphone and loudspeaker signal paths. The basic scheme is straightforward: If audio with only a subset of frequency bands is played in speaker direction, the inverse (or complementary) subset of bands should ideally contain no echo (feedback) when recording the signal in the microphone direction (assuming perfect band separation). If e.g. half of the bands are removed in either direction, (as e.g. shown in FIGS. 3, 4 and 5 and assumed in the present example of FIG. 6), the total volume of the signal will be lowered by 6 dB in each direction.

In the speaker signal path, this can be countered simply by correspondingly applying a compensating gain to the filtered signal (as indicated by the gain unit (A) in the signal processing unit G1+A in FIG. 3A). In the microphone signal path, it is proposed to synthesize signal content in the bands that have been filtered out by stopbands of the filter (as indicated by the gain unit (IP) in the signal processing unit G2+IP in FIG. 3A). In an embodiment, an interpolation of the envelope between the 'open' bands is performed (cf. e.g. WO 2007/006658 A1) in order to retain approximately the same signal power level (as before filtering), as well as making sure that all frequency bands has signal content. The last point is especially important, if two communication devices according to the present disclosure (implementing the complementary filtering scheme) are used at each end of a communication setup (cf. e.g. FIG. 1, station A, B (or FIG. 3A, Near end, Remote end)). If no interpolation (synthesis) is implemented in the microphone path, the speaker signal path filter would cancel out the entire received microphone signal, resulting in no audio being played by the speaker unit.

FIG. 6a illustrates an exemplary frequency spectrum (at a given point in time/time frame) of a speech element (Hello?) picked up by the microphone unit of the communication device (cf. e.g. FIG. 2), possible feedback speech elements (FIG. 6B, 6C) presented at the microphone unit after having been filtered by the feedback paths from the speaker unit to the microphone unit (cf. e.g. FIG. 2). FIG. 6B illustrates a feedback version of the signal (Yes?) received from a device at the far end (and presented by the speaker unit SPK in FIG. 2). FIG. 6C illustrates an echo of the signal (Hello?) transmitted to the device at the far end (and returned and presented by the speaker unit SPK in FIG. 2). FIG. 6D illustrates an exemplary filtering characteristic of the controllable digital filter (G2 in FIG. 2) of the microphone signal path (MSP in FIG. 2), as also shown in FIG. 5B. The input sound signal (IS) to the microphone unit (MIC in FIG. 2) of the microphone signal path (MSP) is a mixture of the target sound element (Hello?, FIG. 6a) and the signals (Yes? (FIG. 6B) and Hello? (FIG. 6C)) propagated from the speaker unit (SPK in FIG. 2) via the feedback path. The electric microphone input signal (M-IN) originating from input sound (IS) is processed in signal processing unit (G2) comprising the controllable filter with filtering characteristics of FIG. 6D and the resulting filtered signal (M-OUT in FIG. 2) is shown in FIG. 6E. It appears that only speech elements of the target signal Hello? are present in the resulting filtered signal, whereas the feedback/echo signals have been filtered out. FIG. 6F shows an output signal of the signal processing unit of the microphone signal path (G2 of FIG. 2 or G2+IP of FIG. 3A), wherein the filtered signal in FIG. 6E (cf. indication ORIGINAL) has been processed to include synthesized signal content (cf. indication SYNTHETIC in FIG. 6E) in the bands that have been filtered out by stopbands ($SB_{2,j}$) of the (MSP-) filter.

FIG. 7 shows three embodiments of a communication device according to the present disclosure. The embodiments of FIGS. 7A, 7B and 7C comprises the same elements as the embodiments of FIGS. 2 and 3A, i.e. a speaker signal path (SSP), a microphone signal path (MSP)—both comprising a signal processing unit for processing signals of the respective paths—and a control unit (CONT) for controlling the signal processing unit(s) in dependence of detector units and/or inputs to the control unit. All three embodiments of FIG. 7 comprises analysis (A-FB) and synthesis (S-FB) filter banks allowing inputs (S-IN, M-IN) to and outputs (S-OUT, M-OUT) from the loudspeaker and microphone signal paths, respectively, to be in the time domain, while processing of the input signals is performed fully or partially in the (time-) frequency domain. In the embodiment of FIG. 7A, the processing of the input signals to the loudspeaker and microphone signal paths is performed fully in the (time-) frequency domain (cf. units PR-F, SSP-F and PR-F, MSP-F, respectively). In the embodiment of FIG. 7B, the processing of the input signals to the loudspeaker and microphone signal paths is performed partly in the time domain (cf. units PR-T) and partly in the (time-) frequency domain (cf. units PR-F, SSP-F and PR-F, MSP-F, respectively). In the embodiment of FIG. 7C, the processing of the input signal to the loudspeaker path is performed fully in the (time-) frequency domain (cf. units PR-F, SSP-F), whereas the processing of the input signal to the microphone signal path is performed partly in the time domain (cf. units TD-SQ) and partly in the (time-) frequency domain (cf. units PR-F, MSP-F). In general, the control unit (CONT) may comprise processing of signals in the time-domain as well as signals in the (time-) frequency domain. In FIG. 7, the following abbreviations are used:

PR denotes processing, T time domain, and F Frequency domain. The PR-T and PR-F-blocks may implement various squelch and gain functionality as appropriate and possible other tasks that are performed on the signals of the two paths. The SSP-F and MSP-F are the complementary filters of the 'Microphone signal path' (MSP) and 'Speaker signal path' (SSP), respectively. A-FB and S-FB are analysis and synthesis filter banks, respectively.

Figure 7A:
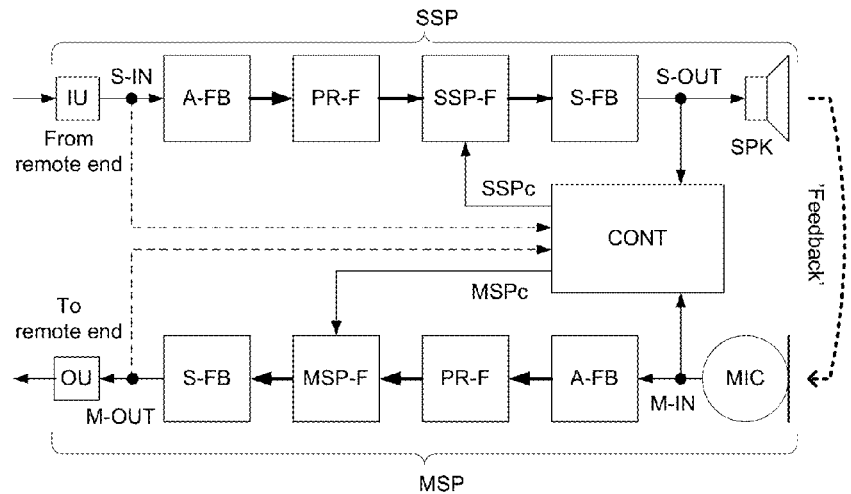
FIGS. 7A-7D shows four embodiments of a communication device according to the present disclosure, FIG. 8 schematically shows a conversion of a signal in the time domain to the time-frequency domain, FIG. 8A illustrating a time dependent sound signal (amplitude versus time) and its sampling in an analogue to digital converter, FIG. 8B illustrating a resulting 'map' of time-frequency units after a Fourier transformation of the sampled signal.
Figure 7B:
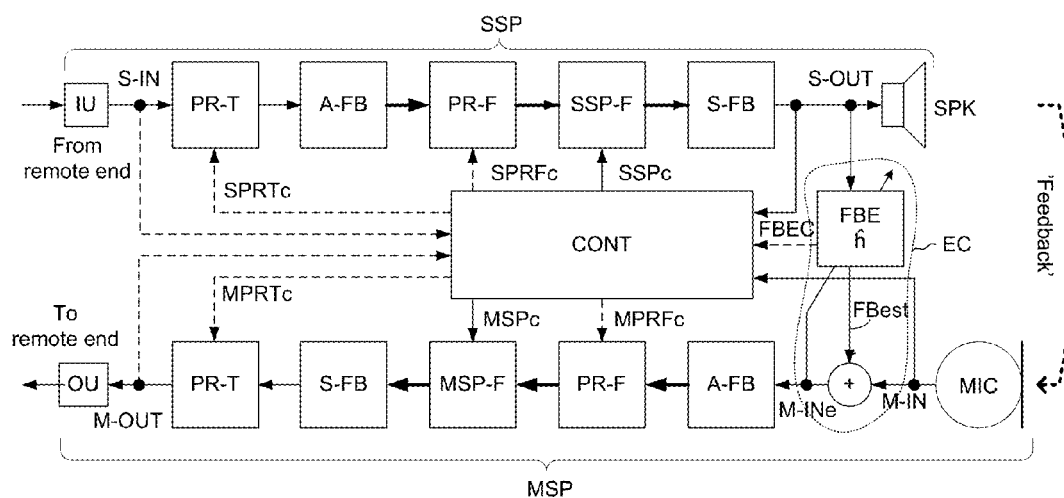
Figure 7C:
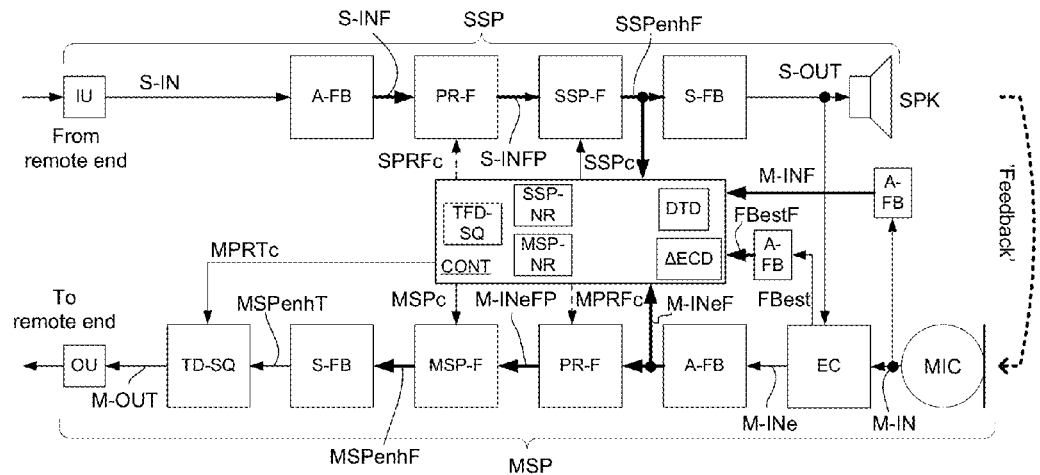

The signal processing units PR-F in FIG. 7A, 7B, 7C all receive time-frequency representations of an input signal and provides a processed signal also in a time-frequency representation. The PR-F units may in general execute any appropriate signal enhancement algorithm appropriate at the location of the unit in the signal path in question, e.g. perform functions like noise reduction (e.g. squelch), apply frequency dependent gain, perform bandwidth extension, etc.

An acoustic/mechanical feedback path from the speaker unit (SPK) to the microphone unit (MIC) is indicated by dashed arrow denoted 'Feedback'.

FIG. 7A shows an embodiment of a communication device, wherein the control unit (CONT) controls the complementary filters of the 'Microphone signal path' (MSP) and 'Speaker signal path' (SSP), via respective control signals SSPc and MSPc based on the (time-domain) (raw) microphone input signal (M-IN) of the microphone signal path and the processed output signal (S-OUT) to the loudspeaker (SPK) of the loudspeaker signal path. The control unit (CONT) may receive other control inputs for use in its evaluation of the current (acoustic) situation, e.g. as shown in FIG. 7A (by dotted arrows) time domain signals S-IN and M-OUT. A conversion to the frequency domain of input signals to the control unit (CONT) may be performed in the control unit as necessary.

FIG. 7B shows an embodiment of a communication device comprising the elements of FIG. 7A. Additionally, a feedback estimation unit (FBE) is included between the loudspeaker (SSP) and microphone (MSP) signal paths to estimate the feedback path from the loudspeaker unit (SPK) to the microphone unit (MIC). Further, feedback compensation is included in the microphone signal path (e.g.) by subtracting (in SUM-unit '+') the feedback estimate $FB_{est}$ from the feedback estimation unit (FBE) from the microphone input signal (M-IN) thereby providing feedback corrected (or echo cancelled) input signal (M-INe), which is fed to the analysis filter bank (A-FB) for further processing in the time-frequency domain. A control input signal FBEC to the control unit (CON) representing an estimate of the feedback path and/or a change to the feedback estimate is (optionally) provided. Additionally, the loudspeaker (SSP) and microphone (MSP) signal paths each comprise time-domain processing units PR-T located before the analysis filter bank (A-FB) of the loudspeaker (SSP) signal path and after the synthesis filter bank (S-FB) of the microphone signal path (MSP). The time-domain processing units PR-T may e.g. comprise noise reduction (e.g. squelch), compression (e.g. automatic gain control (AGC)), etc. Further, the control unit (CONT) may in addition to the SSP- and MSP-filters, control processing units PR-F and PR-T of the loudspeaker (SSP) and microphone (MSP) signal paths as indicated by corresponding control signals (SPRFc, SPRTc) and (MPRFc, MPRTc), respectively.

The feedback estimation unit (FBE) preferably comprises an adaptive filter. The adaptive filter comprises a variable filter part comprising variable filter coefficients for filtering an input signal and an adaptive algorithm part for adaptively determining the filter coefficients applied to the variable filter at a given point in time. The adaptive algorithm part comprises a prediction error algorithm, e.g. an LMS (Least Means Squared) algorithm, in order to predict and cancel the part of the microphone input signal (M-IN) that is caused by feedback from the loudspeaker unit (SPK) of the communications device. The prediction error algorithm uses a reference signal (here equal to the processed output signal S-OUT to the loudspeaker unit (SPK)) together with the (feedback corrected) microphone signal (here signal M-INe) to find the setting of the adaptive filter that minimizes the prediction error when the reference signal is applied to the adaptive filter (thereby minimizing feedback).

FIG. 7C illustrates an embodiment a communication device (CD) according to the present invention.

The communication device of FIG. 7C comprises the basic components of the general embodiment of FIG. 2, and FIG. 7A including separate microphone and loudspeaker signal paths (MSP and SSP, respectively) controlled by a control unit (CONT). The communication device of FIG. 7C further comprises the basic components of FIG. 7B, except the time-domain processing unit (PR-T) in the loudspeaker signal path. The particulars of the embodiment of FIG. 7C is described in the following.

Microphone Signal Path (MSP):

The communication device of FIG. 7C comprises an echo canceller (EC) for estimating properties of a feedback path from the loudspeaker (SPK) to the microphone unit (MIC). The (time-domain) (raw) microphone input signal (M-IN) is fed to the echo canceller (EC) and is converted to the time-frequency domain in analysis filter bank (A-FB) providing (band split) signal (M-INF), which is fed to the control unit (CONT) (e.g. for use as an input to the doubletalk detector (DTD)). In the echo canceller (EC), a (time-domain) estimate (FBest) of the feedback path is subtracted from the microphone input signal (M-IN) providing echo cancelled (time-domain) microphone signal (M-INe), which is converted to the time-frequency domain in analysis filter bank (A-FB) providing (band split) signal (M-INeF), which is fed to the control unit (CONT) as well as to the (optional) processing unit PR-F. The processing unit (PR-F) may e.g. comprise further processing algorithms for noise reduction, compression, etc., providing processed microphone path signal M-INeFP, which is fed to the microphone signal path filter (MSP-F). The microphone signal path filter (MSP-F) is controlled by the control unit (CONT), e.g. based on a time-frequency squelch unit (TFD-SQ) determining attenuation values based on a TFM-algorithm, which takes two input signals, where one is predominantly speech (e.g. a signal from the microphone signal path, e.g. signal M-INeF) and one is predominantly noise (e.g. a signal from the loudspeaker signal path, e.g. the loudspeaker output signal, or the loudspeaker output signal filtered through the feedback path, e.g. feedback estimate signal FBestF, which is fed to the control unit (CONT) (also for use as an input to the doubletalk detector (DTD)). The TFM algorithm actually needs the energy or power of the input signals, hence it can work on both complex and real frequency domain representations. The energy of the two input signals is averaged/smoothed across time in each frequency band. An energy ratio is then calculated between the two averaged signals for each frequency band, and finally an output for each frequency band is found on the basis of the ratio and appropriate control of the microphone signal path filter (MSP-F) is applied via control signal MSPc. The time-frequency-based squelch unit (TFD-SQ) has information about the setting of filtering characteristics of the loudspeaker signal path filter (SSP-F) and is configured to (automatically) implement a complementary filtering characteristic in the microphone signal path filter (MSP-F). It will therefore always apply the necessary amount of attenuation in the microphone signal path. The signal path filter (MSP-F) provides enhanced output signal MSPenhF in the time-frequency domain, which is fed to synthesis filter bank S-FB providing a single time-domain signal MSPenhT. The enhanced time-domain signal MSPenhT is fed to time-domain squelch unit TD-SQ providing further enhanced output signal M-OUT from the microphone signal path, which is fed to output unit OU for transmission to (a loudspeaker signal path of) a communication device at a remote station. The time-domain squelch algorithm of the TD-SQ-unit is e.g. based on a side-chained compressor. This means that the compressor compresses the microphone path signal based on the amplitude of the speaker path signal. The attenuation provided by the time-domain squelch unit TD-SQ is e.g. based on an estimate of the change (over time) of the energy content of the feedback path from the loudspeaker to the microphone of the communication device (e.g. provided by feedback change detector ($\Delta$ECD) of the control unit (CONT), which bases its output on the time-frequency domain signal FBestF and/or on a feedback (change) measure FBM, e.g. based on changes over time of energy content of signals related to the feedback path). This time-domain squelch algorithm is controlled by the control unit (CONT) and only activated when the echo canceller knows it is in a sub-optimal state, e.g. during initial convergence, or after activation of a volume button. In these periods (e.g. 1-2 seconds), the (time-domain) compressor squelch may be switched to a very aggressive setting, which will remove all echo leaks from the microphone path (but also desired near end speech etc.).

Loudspeaker Signal Path (SSP):

The control block (CONT) contains a doubletalk detector (DTD) (implemented as two statistics, a Near End detector (e.g. based on the (raw) microphone input signal M-INF), and a Far End detector (e.g. based on the loudspeaker output signal filtered through the feedback path, e.g. feedback estimate signal FBestF). A gain vector vs. frequency (filter characteristics) of the loudspeaker signal path filter (SSP-F) is determined from these two statistics, which is then applied to the SSP-F unit. The loudspeaker signal path filter (SSP-F) provides enhanced output signal SSPenhF in the time-frequency domain, which is fed to synthesis filter bank S-FB providing a single time-domain signal and to the control unit (CONT), e.g. for use as an input to the doubletalk detector (DTD). In an embodiment, the processing is performed per band in 128 bands, with the result that the complementary filtering is only performed in frequency intervals, where "double talk" is detected (that is, where both far end statistic and near end statistic is high). In an embodiment, the echo suppression mode, where complementary filtering is activated, is implemented on a time-frequency unit level, i.e. at a given time (e.g. index m), complementary filtering is performed in frequency units ($k_x$), where a predefined criterion is fulfilled, e.g. that a double-talk detector detects double talk above a predefined level in said frequency units ($k_x$). An exemplary doubletalk detector for use in the present context of a communication device (e.g. a speakerphone) or in other applications is described in more detail in connection with FIGS. 12 and 13.

The control unit (CONT) further contains noise reduction units SSP-NR and MSP-NR aimed at controlling noise reduction in the loudspeaker and microphone signal paths, respectively. Noise reduction algorithms are e.g. implemented in processing units PR-F of the respective signal paths, controlled by the control unit via control signals SPRFc and MPRFc, respectively.

Processing in the frequency domain is preferably performed to provide full 128 band resolution by all algorithms. Preferably, double talk is detected for every band. A requirement is preferably placed on the total necessary attenuation per band, which these computed values must obey to make the system "tight" with regard to instantaneous echo damping.

Preferably, the echo suppression mode, where complementary attenuation in the loudspeaker and microphone signal paths is activated is only applied locally in bands where it is necessary, instead of over the entire spectrum. As a bonus, this has the advantage of reducing the possible artificial sound of by the complementary filtering.

Figure 7D:
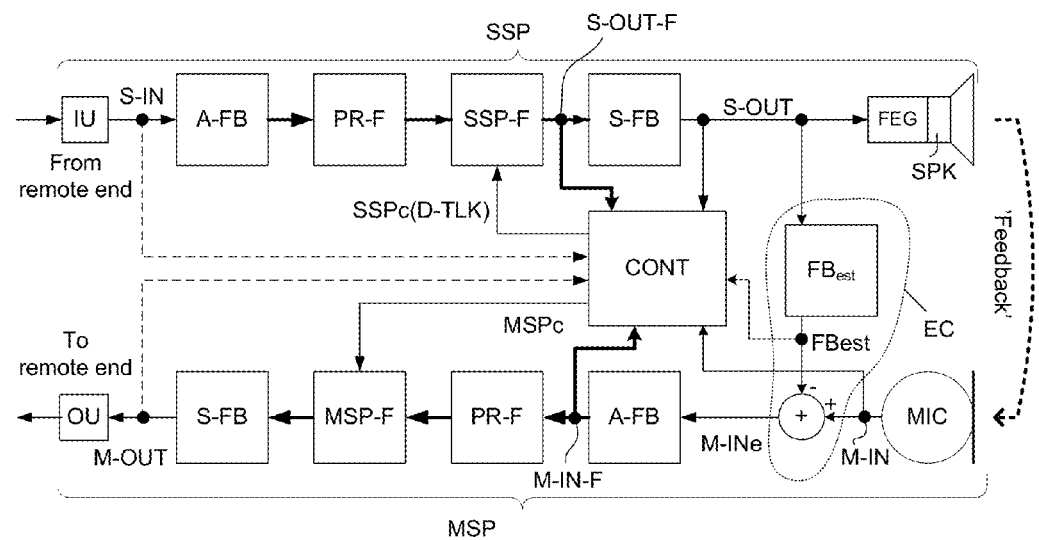

FIG. 7D illustrates a further embodiment a communication device (CD) according to the present invention. The communication device of FIG. 7D comprises the basic components of the embodiment of FIG. 7A, including separate microphone and loudspeaker signal paths (MSP and SSP, respectively) controlled by a control unit (CONT). The communication device of FIG. 7D further comprises a feedback estimation unit ($FB_{est}$, e.g. comprising an adaptive filter) for estimating the feedback path (including dashed arrow denoted 'Feedback' in FIG. 7), represented by signal FBest, which is subtracted from the microphone input signal M-IN in subtraction unit ('+') and additionally fed to the control unit (CONT) for use as an input to the doubletalk detector (DTD, see FIG. 11, 12) forming part of the control unit). The feedback estimation unit ($FB_{est}$) and the subtraction unit ('+') form part of an echo cancellation unit (EC, cf. e.g. units EC in FIGS. 7B, 7C and 12A) for removing feedback from the speaker(s) (SPK) to the microphone(s) (MIC) of the communication device (as indicated by the curved dotted enclosure (EC) in FIGS. 7B and 7D). The microphone input signal M-IN and speaker output signal S-OUT are also fed to the control unit (CONT) for use as inputs to the doubletalk detector (DTD). The control unit may comprise time to time-frequency conversion unit as appropriate. Time-frequency domain signals S-OUT-F and M-IN-F of the speaker and microphone paths, respectively, are likewise fed to the control unit for possible use in the doubletalk detector (DTD. The output D-TLK of the doubletalk detector (DTD, see FIG. 11, 12) is used to control (or influence) the SSP-filter (SSP-F) (via signal SSPc(D-TLK) of the speaker signal path (SSP), in particular to control frequency dependent gains during time segments where simultaneous speech elements occur in the speaker and microphone paths. In the embodiment of FIG. 7D, a front end gain unit (FEG) is associated with the speaker unit (SPK) of the speaker signal path (SSP). The front end gain unit (FEG) may include variable, e.g. analogue, e.g. user controlled (volume), gains. In the embodiment of FIG. 7D, the echo canceller (EC) works in the time domain. Alternatively, the echo canceller (EC) may work in the time-frequency domain, and e.g. be located after the analysis filter bank (A-FB) of the microphone signal path (MSP) to receive band split input signals (e.g. M-IN-F). In such case, the adaptation rate (e.g. a step size of the algorithm) of an adaptive algorithm of the echo canceller, may be controlled or influenced by the output of the doubletalk detector (DTD, cf. FIG. 12, 13).

Figure 8A:
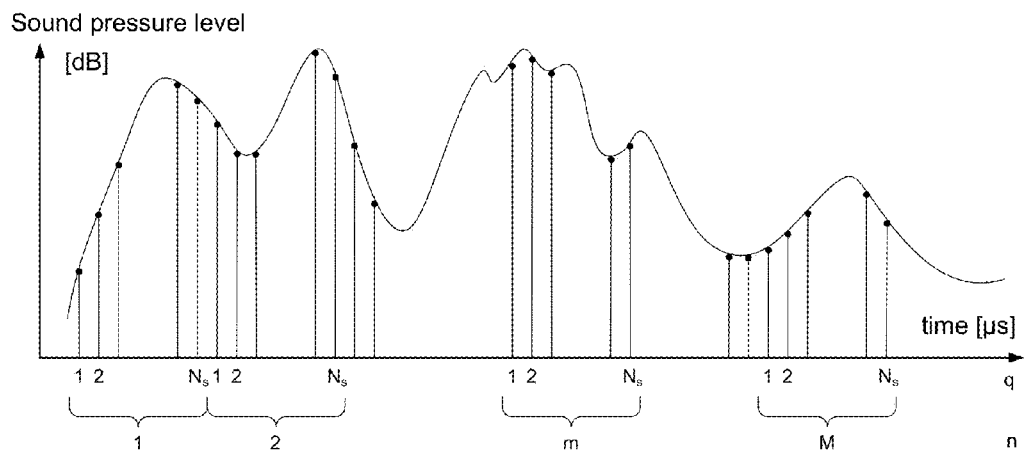
Figure 8B:
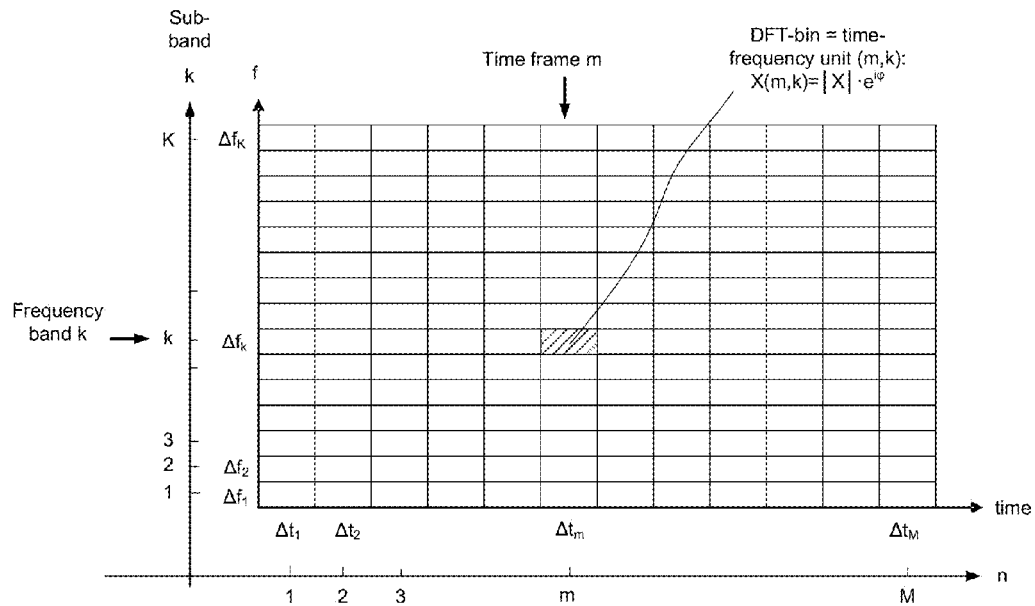
Figure 9A:
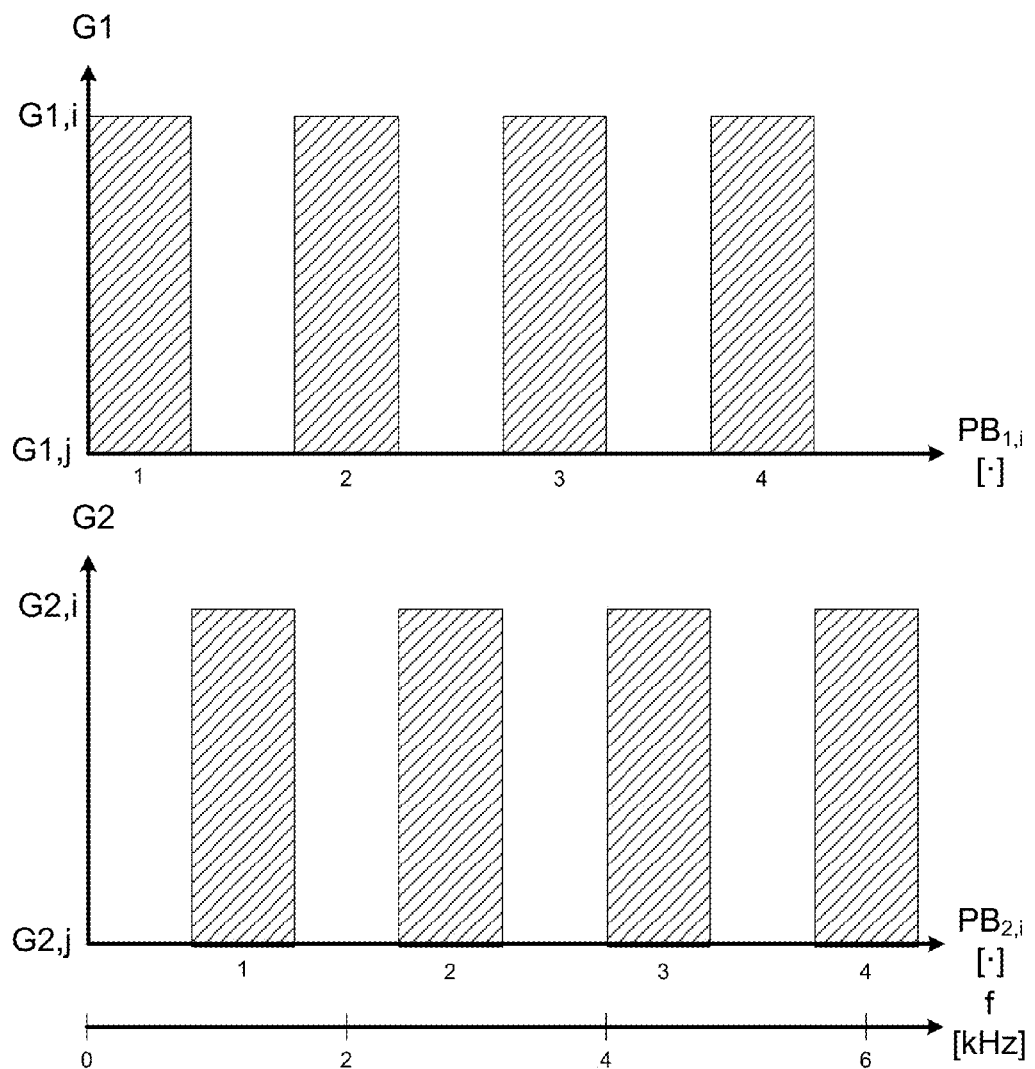
FIGS. 9A-9D schematically shows four different examples of configuring corresponding complementary filter characteristics of the filters of the speaker and microphone signal paths, respectively
Figure 9B:
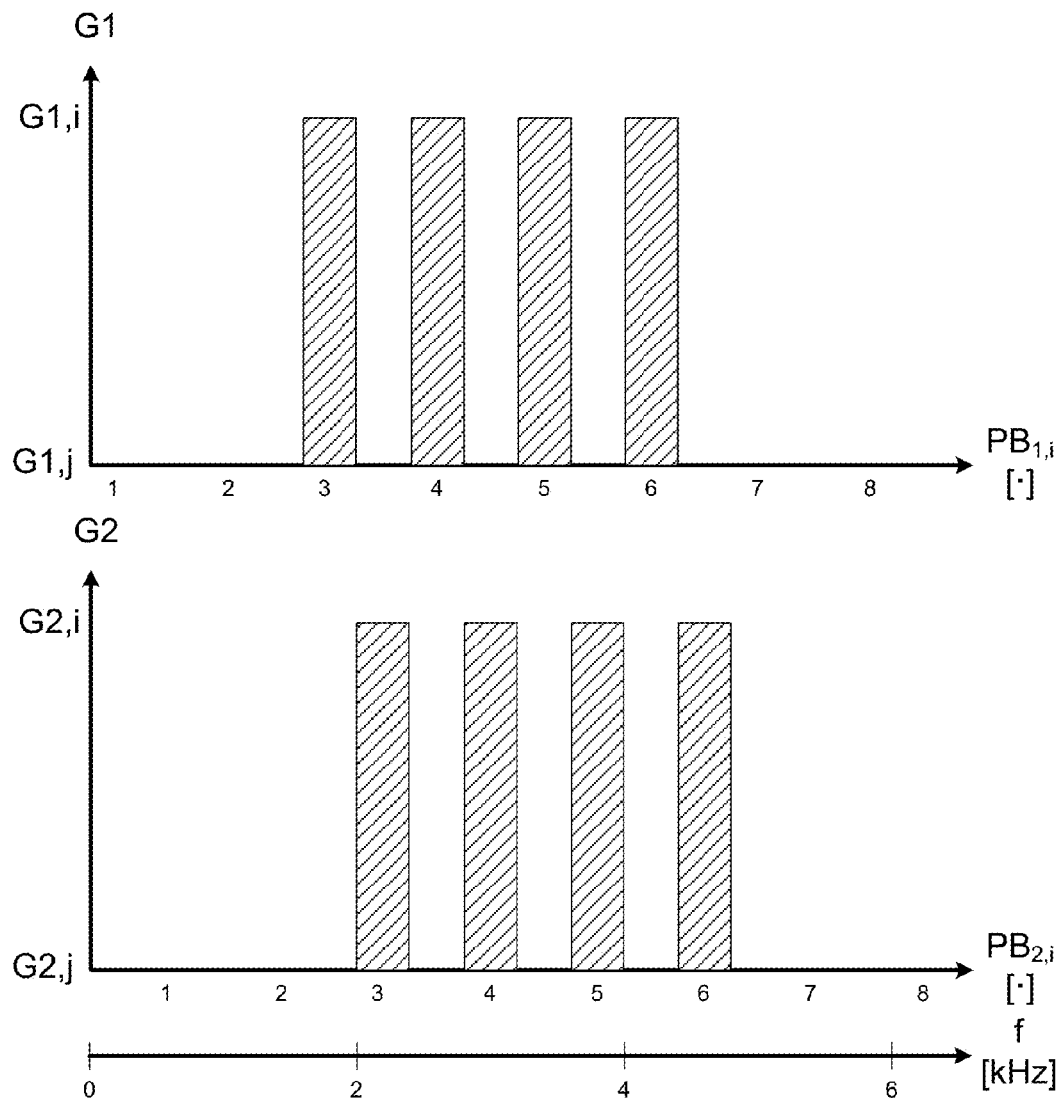
Figure 9C:
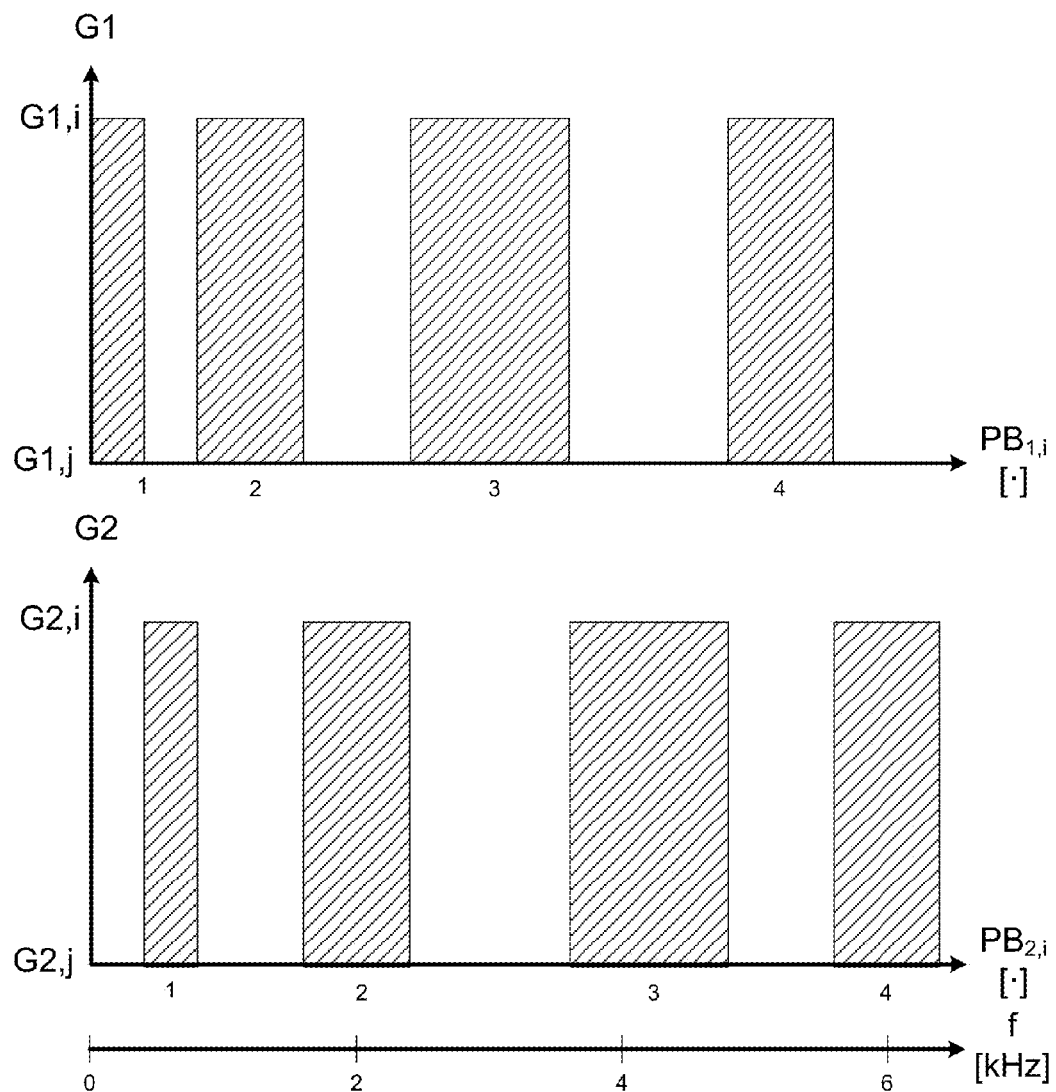
Figure 9D:
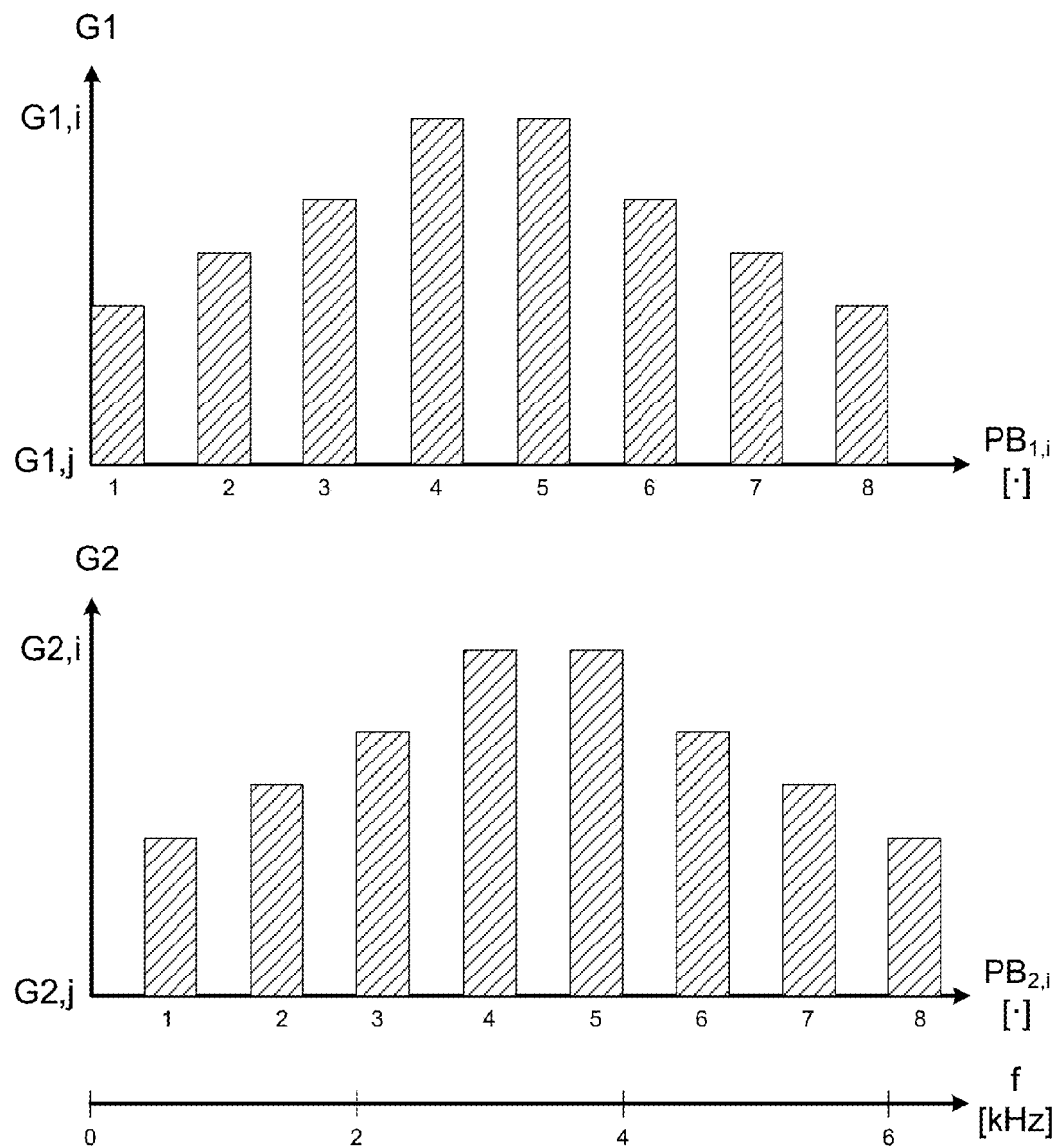

FIG. 8 shows a conversion of a signal in the time domain to the time-frequency domain, FIG. 8A illustrating a time dependent sound signal (amplitude versus time) and its sampling in an analogue to digital converter, FIG. 8B illustrating a resulting 'map' of time-frequency units after a Fourier transformation of the sampled signal.

FIG. 8A illustrates a time dependent sound (audio) signal (amplitude versus time), its sampling in an analogue to digital converter and a grouping of time samples in frames, each comprising $N_s$ samples. The graph, showing a sound pressure level in dB versus time (solid line in FIG. 8A), may e.g. represent the time variant analogue electric signal provided by an input transducer, e.g. a microphone, before being digitized by an analogue to digital conversion unit. FIG. 8B illustrates a 'map' of time-frequency units resulting from a Fourier transformation (e.g. a discrete Fourier transform, DFT) of the input signal of FIG. 8A, where a given time-frequency unit (m,k) corresponds to one DFT-bin and comprises a complex value of the signal X(m,k) in question ($X(m,k)=|X| \cdot e^{i\phi}$, $|X|$=magnitude and $\phi$=phase) in a given time frame m and frequency band k. In the following, a given frequency band is assumed to contain one (generally complex) value of the signal in each time frame. It may alternatively comprise more than one value. The terms 'frequency range' and 'frequency band' are used in the present disclosure. A frequency range may comprise one or more frequency bands. The Time-frequency map of FIG. 8B illustrates time frequency units (m,k) for k=1, 2, ..., K frequency bands and m=1, 2, ..., M time units. Each frequency band $\Delta f_k$ is indicated in FIG. 8B to be of uniform width. This need not be the case though. The frequency bands may be of different width (or alternatively, frequency channels may be defined which contain a different number of uniform frequency bands, e.g. the number of frequency bands of a given frequency channel increasing with increasing frequency, the lowest frequency channel(s) comprising e.g. a single frequency band). The time intervals $\Delta t_m$ (time unit) of the individual time-frequency bins are indicated in FIG. 8B to be of equal size. This need not be the case though, although it is assumed in the present embodiments. A time unit $\Delta t_m$ is typically equal to the number $N_s$ of samples in a time frame (cf. FIG. 8A) times the length in time $t_s$ of a sample ($t_s=(1/f_s)$, where $f_s$ is a sampling frequency). A time unit is e.g. of the order of ms (e.g. in the range 1 ms to 10 ms) in a communication device according to the present disclosure.

FIG. 9 schematically shows four different examples of configuring corresponding complementary filter characteristics of the filters of the speaker and microphone signal paths, respectively. FIG. 9 illustrates examples (FIG. 9A, 9B, 9C, 9D) of the distribution of pass bass bands ($PB_{q,i}$) and stopbands ($SB_{q,i}$) (q=1, 2) over frequency for a loudspeaker signal path (SSP) filter (G1, ($PB_{1,i}$, $SB_{1,j}$)) and a microphone signal path (MSP) filter (G2, ($PB_{2,i}$, $SB_{2,j}$)). The frequency range of interest is indicated to be 0 Hz to a little more than 6 kHz. This is just an example. The minimum and maximum frequency may be adapted to the application in question. The maximum frequency may e.g. be smaller than 6 kHz, or larger than 6 kHz, e.g. around 8 kHz or 10 kHz or 12 kHz or more. As described in connection with FIG. 4, the frequency range of interest is divided into a number passbands numbered from i=1 to i=$N_{PB}$) and stopbands ($SB_{q,j}$, j=1, 2, ..., $N_{SB}$), q=1, 2. The attenuation in the pass and stopbands are denoted $G_{q,i}$ and $G_{q,j}$, respectively, q=1, 2. In an ideal (normal) situation (as e.g. in an ideal digital filter), $G_{q,i}$=1, i=1, 2, ..., $N_{PB}$ and $G_{q,j}$=0, j=1, 2, ..., $N_{SB}$, q=1, 2. This is the case in FIGS. 9A, 9B and 9C, but not in FIG. 9D. In FIG. 9D the attenuation values $G_{q,i}$ of the passbands vary over frequency, whereas the attenuation values $G_{q,j}$ of the stopbands are constant (e.g. at 0). However, the attenuation values $G_{q,j}$ of the stopbands may in another embodiment vary over frequency, e.g. in a similar or different manner than the passbands. The passbands and stopbands are generally arranged in pairs where a passband and stopband of a given passband-stopband-pair are of equal width in frequency. This is the case for all illustrated examples of FIG. 9, but need not be the case. The bandwidth of a pass and stopband of a passband-stopband-pair may be different. All passbands and stopbands may be of equal width, as in FIGS. 9A, 9B and 9D, or have different widths, as in FIG. 9C. The passbands and stopbands may (together) cover the whole frequency range of interest, as in FIGS. 9A, 9C and 9D, or only a part of the frequency range of interest, as in FIG. 9B (where only a middle part of the frequency range or interest is covered). The number of frequency bands and the centre frequencies of the bands may likewise vary as the case may be.

The control unit is configured to control the particular complementary filter characteristics of the filters of the speaker and microphone signal paths applied at a given point in time, including the values of the number of pass and stopbands, their individual centre frequencies, and band widths, their attenuation and the frequency ranged covered by the pass and stopbands.

FIG. 10 show application scenarios of embodiments of a communication device according to the present disclosure when simultaneously connected to a PC and a cellular telephone. FIG. 10 shows an embodiment of a communication device (CD) comprising two wired audio interfaces to other devices, a) a wireless telephone (CellPh, e.g. a cellphone, e.g. a Smartphone), and b) a computer (PC, e.g. a PC). The audio interface to the computer (PC) comprises an USB (audio) interface including a cable and an USB-connector (PC-Con) for directly connecting the communication device to the computer and allowing two-way audio to be exchanged between the communication device and the computer. The audio interface to the wireless telephone (CellPh) comprises a cable and a phone connector (PhCon) for directly connecting the communication device to the computer and allowing two-way audio to be exchanged between the communication device and the computer. Preferably, the phone connector has the function of a headset connection (to transfer the audio input of the wireless telephone to the microphone(s) (MIC) of the communication device, and to transfer the audio output of the wireless telephone to the loudspeaker(s) (SPK) of the communication device. The communication device (CD) comprises a number of activation elements (B1, B2, B3), e.g. push buttons (or alternatively a touch sensitive display) allowing the control of functions of the communication device and/or devices connected to the communication device. Preferably, one of the activation elements (e.g. B1) is configured to allow connection (hook-off, answer call) and/or dis-connection (hook-on, terminate call) of the wireless telephone (CellPh) connected to the communication device via the phone connector (PhCon). Preferably one of the activation elements (e.g. B2) is configured to allow a user to control the volume of the loudspeaker output.

Figure 10A:
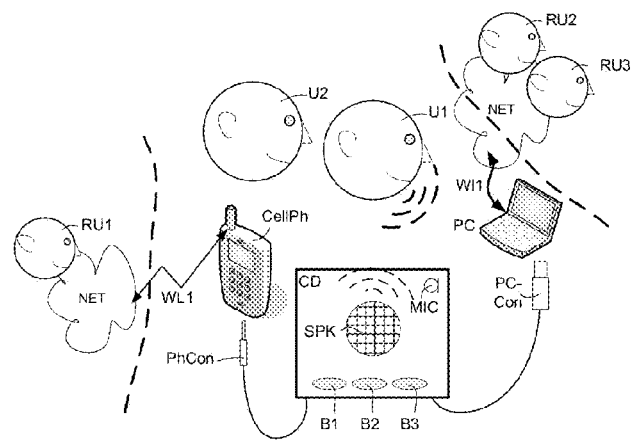
FIGS. 10A-10B shows application scenarios of embodiments of a communication device according to the present disclosure when simultaneously connected to a PC and a cellular telephone.

The scenario shown in FIG. 10A illustrates a teleconference between users (U1, U2) in the vicinity of the communication device (CD) and users (RU1, RU2, and RU3) at two remote locations. Remote user RU1 is connected to the communication device (CD) via wireless telephone (CellPh) and wireless connection WL1 to a network (NET). Remote users RU2, RU3 are connected to the communication device (CD) via computer (PC) and wired connection WI1 to a network (NET).

Figure 10B:
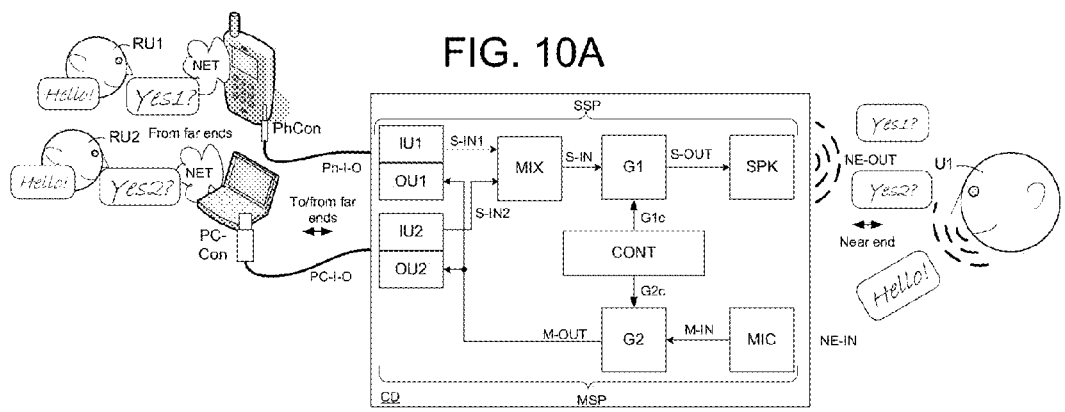

FIG. 10B illustrates the same scenario as FIG. 10A. FIG. 10B, however illustrates the mixing of audio signals from the various devices (CellPh and PC) connected to the communication device (CD). The functional units of the block diagram of the communication device (CD) shown in FIG. 10 are similar to the ones shown in FIG. 2. A difference is that the input unit IU of the loudspeaker signal path (SSP) of the embodiment of FIG. 2 is divided in two (IU1, IU2) for receiving input signals from the respective audio devices (CellPh and PC). Likewise, output unit OU of the microphone signal path (MSP) of the embodiment of FIG. 2 is divided in two (OU1, OU2) for transmitting output signals from the respective audio devices (CellPh and PC). Two-way audio connections between the communication device (units IU1, IU2 and OU1, OU2) and two the audio devices (CellPh and PC) are established via phone connector (Ph-Con) and cable (Ph-I-O), and USB connector (PC-Con) and cable (PC-I-O), respectively. Additionally, the loudspeaker signal path (SSP) of the embodiment of FIG. 10B comprises a mixer (MIX) configured for mixing audio signals received from the connected audio devices, here signal S-IN1 from the input unit IN1 connected to wireless telephone (CellPh) and signal S-IN2 from the input unit IN2 connected to computer (PC). Thereby the signal fed to the loudspeaker of the communication device comprises audio signals from several different sources (CellPh and PC). On the output side, the same output signal M-OUT of the microphone path is forwarded to the output units (OU1, OU2) for transmission to the connected audio devices (CellPh and PC) from which the signal is transmitted to devices at a far end. Thereby teleconferences between participants at different locations using different audio devices and/or networks is flexibly enabled.

Figure 11:
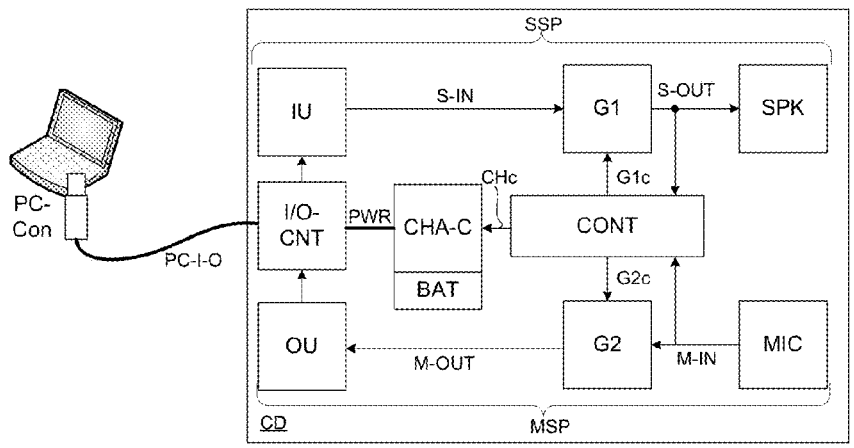
FIG. 11 shows an embodiment of a communication device according to the present disclosure connected to a PC during charging AND operation.

FIG. 11 shows an embodiment of a communication device according to the present disclosure connected to a PC during charging AND operation. The embodiment of the communication device (CD), e.g. a speakerphone, shown in FIG. 11 is similar to the one shown and discussed in connection with FIG. 2. The communication device of FIG. 11, however, additionally comprises a battery (BAT), a connection (here in the form of USB connection cable (PC-I-O) and USB-connector (PC-Con)) to a charging station (PC), an input-output control unit (I/O-CNT) for separating signal (input and output signal to and from input and output unit IU and OU, respectively) and power (PWR), and a charge control unit (CHA-C). In an embodiment, the communication device (CD) is intended to be powered solely by the battery (BAT) during normal operation. In an embodiment, the communication device (CD) is intended to be powered (such as solely powered) from a charging station via the charging connector when connected to the charging station (e.g. a PC), e.g. controlled by the control unit (CONT). The control unit (CONT) receives as inputs (at least) output signal S-OUT fed to the loudspeaker (SPK) and input signal M-IN picked up by the microphone unit (MIC) and provides control signals (G1c and G2c) for controlling the processing units (G1 and G2) of the speaker and microphone signal paths, respectively. In the case where the battery needs to be recharged, the communication device is e.g. connected to a USB charger, e.g. as shown to a PC (which can also comprise the interface to the first network, i.e. be the host of (at least a part of) the teleconference audio signal). In such case the communication device (CD) can (while the battery is being charged) be configured for receiving streaming audio (e.g. music) or for making IP telephony originating from the PC. Instead of terminating the charge cycle, the current is adapted so that the total current drawn from the USB port does not exceed a maximum (e.g. 500 mA) negotiated with the host (here the PC). The current consumption needed by the communication device is heavily dependent on the volume control of the loudspeaker due to the typically low impedance of the loudspeaker and its class D amplifier. The communication device (CD) is therefore configured to let the level of the volume control the amount of current the battery is charged with. The control unit (CONT) thus provides control signal (CHc) to the charge control unit (CHA-C) based on the level of output signal S-OUT (or by a signal indicating a setting of the volume of the speaker output).

Figure 12A:
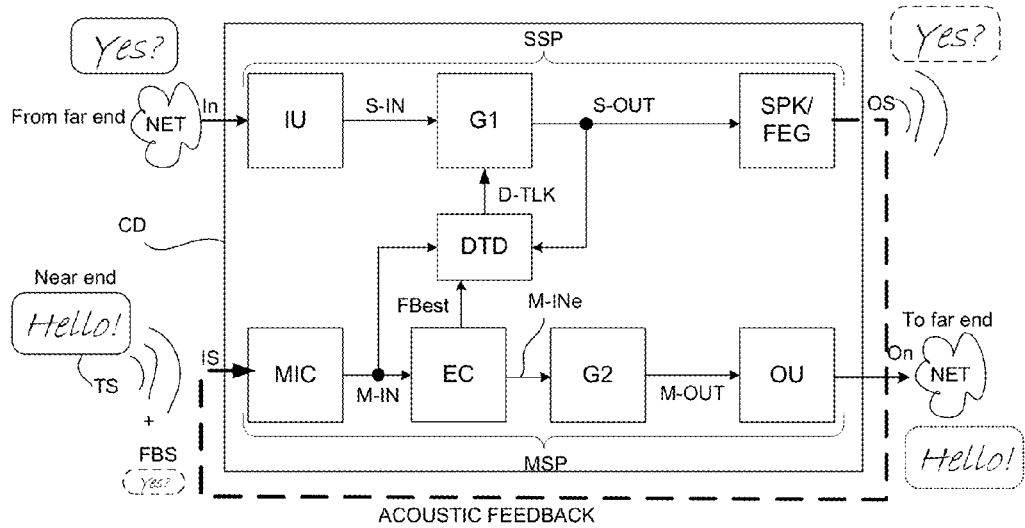
FIG. 12 shows a communication device including a doubletalk detector according to the present disclosure (FIG. 12A), and first and second embodiments of a doubletalk detector according to the present disclosure (FIGS. 12B and 12C, respectively)
Figure 12B:
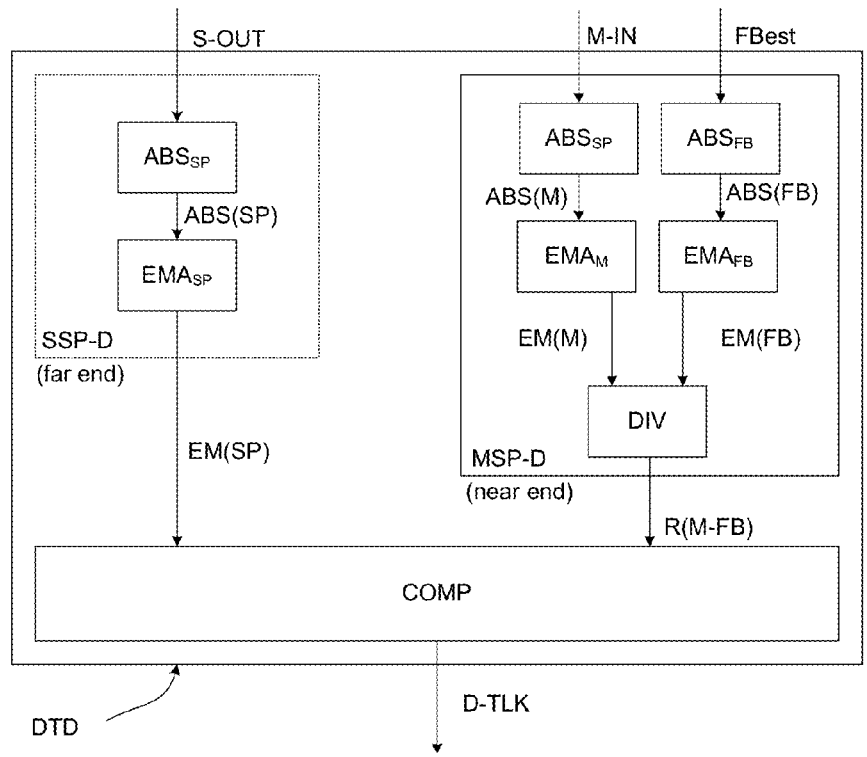
Figure 12C:
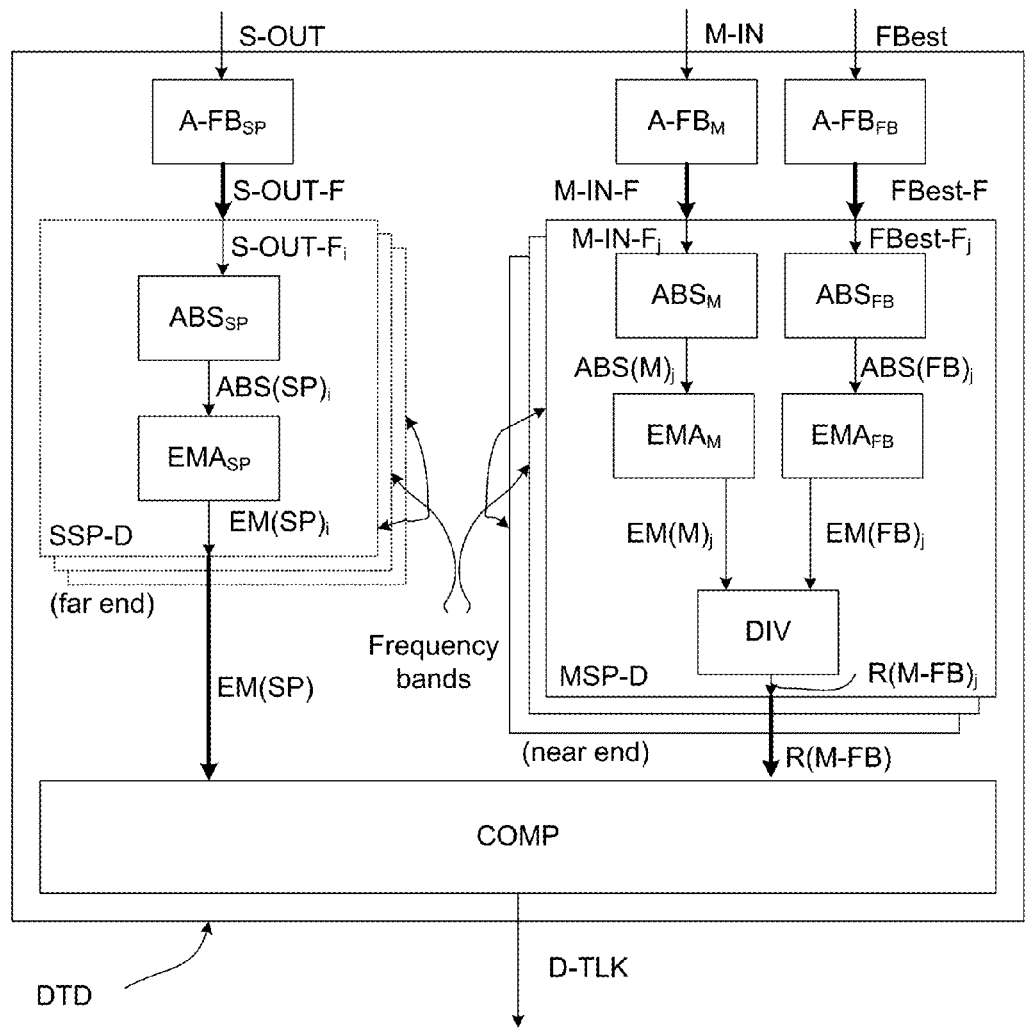

FIG. 12A shows an embodiment of a communication device (CD) comprising a doubletalk detector according to the present invention. The doubletalk detector is intended to be used in a general communication device as illustrated in FIG. 12 (as well as in a communication device according to the present disclosure as described in FIG. 1-11). The communication device (CD) of FIG. 12A is similar to the embodiment shown in FIG. 2. Only the differences to FIG. 2 are described in the following. The control unit (CONT) of FIG. 2 is represented by the doubletalk detector (DTD) in FIG. 12A. The speaker signal path (SSP) comprising a 'far end signal' further comprises a front end (variable) gain unit (FEG) coupled to the speaker unit (SPK) (cf. unit SPK/FEG in FIG. 12A). The front end gain unit may e.g. allow a user to change a volume of the output sound OS (within certain limits). The microphone signal path (MSP) comprising a 'near end signal' further comprises an echo cancelling unit (EC), here inserted between the microphone unit and the MSP-signal processing unit (G2). The echo cancelling unit may be based on a variety of principles, preferably comprising a feedback estimation unit for estimating a feedback path from the speaker unit (SPK) to the microphone unit (MIC) (cf. e.g. signal FBest) and for using such estimate to compensate the input signal from the microphone (e.g. to subtract the feedback path estimate from the input signal from the microphone). The feedback estimation unit preferably comprises an adaptive filter. The adaptive filter comprises e.g. a variable filter part comprising variable filter coefficients for filtering an input signal and an adaptive algorithm part for adaptively determining the filter coefficients applied to the variable filter at a given point in time. The doubletalk detector (DTD) receives inputs from the microphone signal path (MSP), here signal M-IN from microphone unit (MIC), signal FBest from the echo canceller (EC), and from the speaker signal path (SSP), here signal S-OUT from the SSP-processing unit (G1). Based on these signal, the doubletalk detector (DTD) provides control signal D-TLK to control or influence the signal processing of the SSP-processing unit (G1). Embodiments of the doubletalk detector are further described in connection with FIG. 12B, FIG. 12C and FIG. 13.

FIG. 12B shows a first embodiment of a doubletalk detector according to the present disclosure. The doubletalk detector (DTD) comprises a 'near end detector' (MSP-D in FIGS. 12B, 12C and 13) and a 'far end detector' (SSP-D in FIGS. 12B, 12C and 13) and a combination unit (COMP) for combining the outputs of the near end and far end detectors to provide a resulting doubletalk control signal D-TLK. The aim of the doubletalk detector is (as the name indicates) to identify time segments, where speech is present in the microphone signal path as well as in the speaker signal path. Further, the aim of the 'far end detector' is to identify time segments where speech (from the far end) is present in the speaker signal path. Likewise, the aim of the 'near end detector' is to identify time segments where speech (from the near end, picked up by the microphone) is present in the microphone signal path.

The near end detector (MSP-D) represents a part of the algorithm, which is responsible for detecting only the near end signal (of the microphone signal path). That is, it must react to a speaker in the same room as the communication device itself (e.g. CD in FIG. 12A), but must not react to echo from the device itself (received from the other end and played by the speaker of the device). The 'near end statistic' is formed by first taking the absolute value or magnitude (ABS, cf. unit $ABS_M$ in FIGS. 12B, 12C and 13) of the untreated (raw) microphone input signal (cf. e.g. M-IN in FIG. 12A) providing signal ABS(M), and of the estimate of the feedback path (cf. FBest in FIG. 12A) providing signal ABS(FB). Secondly, the respective absolute values (signals ABS(M) and ABS(FB)) are averaged over time (e.g. on a time frame basis), cf. respective units $EMA_M$ and $EM_{AFB}$ providing enhanced signal EM(M) and EM(FB), respectively. In an embodiment, the time average is performed as an exponential moving average, where decreasing weights are attributed to signal values, the older the values are. A measure of the mutual strength (e.g. the ratio) of the resulting (time averaged) enhanced signals ($EMA_M/EM_{AFB}$) is determined by unit (DIV), here a division unit, providing the resulting near end evaluation signal R(M-FB) of the near end detector (MSP-D) (the resulting signal being representative of the relative strengths of EM(M) and EM(FB), e.g. their ratio).

The far end detector (SSP-D) must detect only the far end signal. This is simpler than the task of the near end detector (MSP-D), since the far end signal is pure when processed by the device, and then played by a speaker (e.g. SPK of FIG. 12A). The far end statistic is simply formed as the absolute value (ABS, cf. unit $ABS_{SP}$ in FIGS. 12B, 12C, and 13) providing signal ABS(SP), and a subsequent time average performed by units $EMA_{SP}$ (e.g. an exponential moving average) providing enhanced signal EM(SP) constituting the resulting far end evaluation signal of the far end detector (SSP-D).

The outputs of the near end (MSP-D) and far end (MSP-D) detectors, i.e. signals R(M-FB) and EM(SP), respectively, are compared in a processing unit (COMP) providing a resulting control signal D-TLK. The resulting doubletalk control signal D-TLK is intended to indicate whether or not double talk is assumed (estimated) to be present, e.g. via a binary indication, or, alternatively (or additionally), to provide an estimated probability of the presence of double talk.

FIG. 12C shows a second embodiment of a doubletalk detector according to the present disclosure. The embodiment of FIG. 12C differs from the embodiment of FIG. 12B in that it is specifically shown that the far end and near end statistics (signals EM(SP) and R(M-FB), respectively, are determined in the (time-)frequency domain. This is indicated by the respective analysis filter banks ($A-FB_{SP}$, $A-FB_M$, and $A-FB_{FB}$) converting respective time-domain signals (S-OUT, M-IN and FBest) to a number of (time varying) frequency band signals (S-OUT-F, M-IN-F and FBest-F). Time domain signals are indicated in thin line, whereas time-frequency domain signals are indicated in bold line. The frequency band split is further indicated by the dotted (shadow) rectangles around each or the far and near end detectors, intended to represent identical processing in each frequency band. Further, signals of the 'top level' illustration of the detectors (SSP-D and MSP-D) are provided with frequency band indices i and j, respectively. Preferably, the processing of the detectors are performed in the same number of frequency bands (e.g. 2 or more, or 8 or more, or 32 or more, or 128 or more). Alternatively, different numbers of frequency bands may be applied to the processing of the far end detector (SSP-D) and the near end detector (MSP-D). In the embodiment of FIG. 12C, the tasks of the far end detector (SSP-D) and the near end detector (MSP-D) are indicated to be fully performed in a number of frequency bands (time-frequency domain). This need not be the case. The tasks of any of the far and near end detectors may be performed partly in the frequency domain and partly in the time domain. An example thereof is illustrated by the embodiment of FIG. 13.

Figure 13:
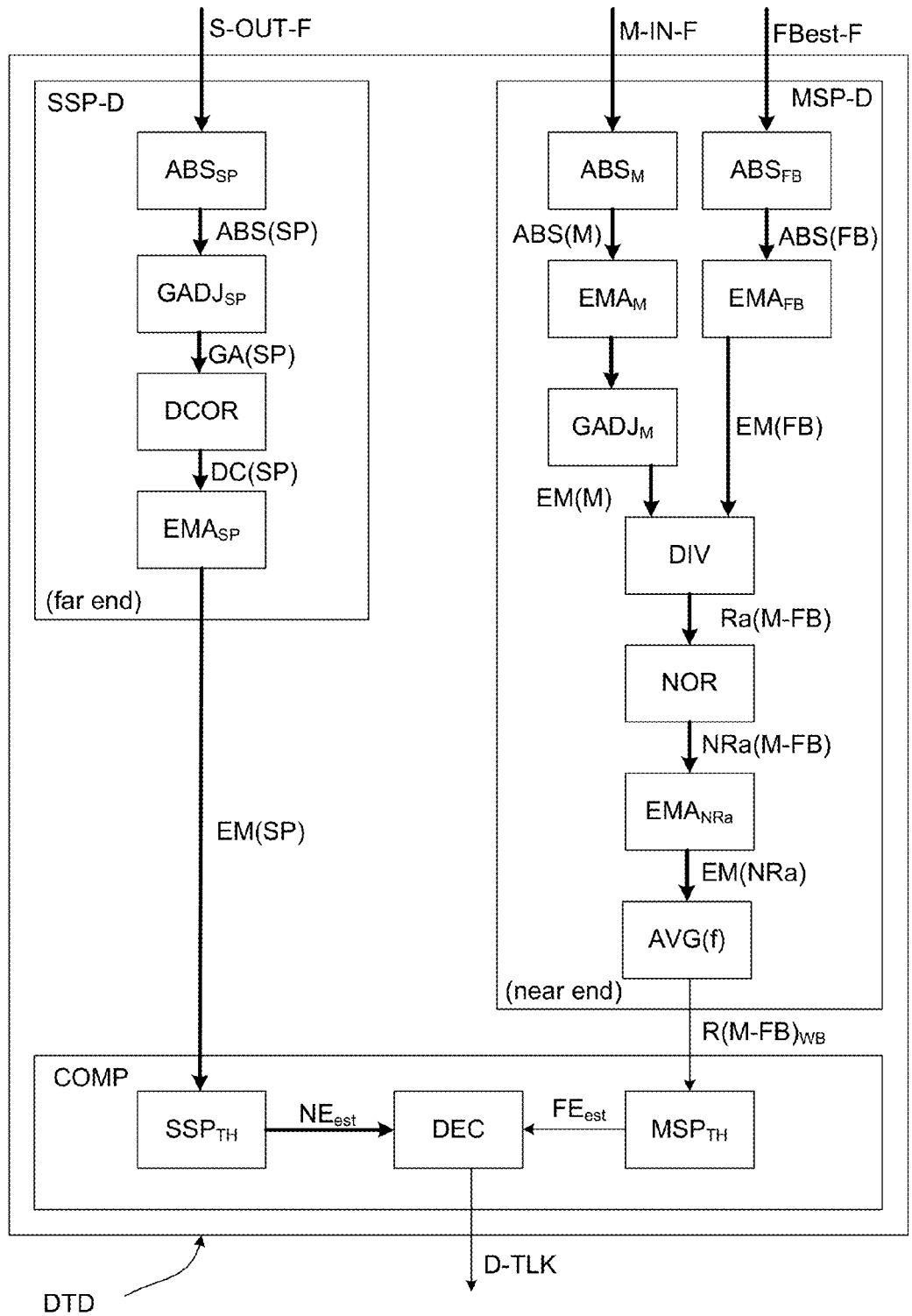
FIG. 13 shows a third embodiment of a doubletalk detector according to the present disclosure.

FIG. 13 shows a more detailed block diagram of an embodiment of a doubletalk detector according to the present disclosure. The embodiment of FIG. 13 includes the same functional blocks as shown in the embodiment of FIG. 12. The additional functional units of the embodiment of FIG. 13 are discussed in the following. Input signals to the far end detector (SSP-D) S-OUT-F and to the near end detector (MSP-D) S-OUT-F and FBest-F, are assumed to be band-split signals (time-frequency domain). In the embodiment of FIG. 12C, the time to time-frequency conversion is performed by analysis filter banks forming part of the doubletalk detector (DTD). In the embodiment of FIG. 13, however, the time to time-frequency conversion is assumed to be performed outside the (DTD), e.g. in the communication device, which the doubletalk detector form part of (cf. e.g. FIG. 7C). As in FIG. 12C, time domain signals are indicated in thin line, whereas time-frequency domain signals are indicated in bold line.

In addition to the ABS and averaging units (ABS, and $EMA_x$, x=M and FB) the near end detector (MSP-D) comprises a gain adjustment unit ($GADJ_M$) for adjusting the time average of the absolute value of the raw microphone input signal (output of the $EMA_M$ unit). The gain adjustment unit ($GADJ_M$) may e.g. perform a down scaling of microphone signal with a predefined amount, e.g. 6 dB, e.g. equally over all frequencies or frequency dependent. The output of the gain adjustment unit ($GADJ_M$), signal EM(M), is fed to the division unit (DIV) together with signal EM(FB), as in FIG. 12. The output of the division unit (DIV), signal Ra(M-FB) representing the ratio of the microphone signal and the feedback (echo) signal (the latter indicating that a signal is present in the speaker signal path AND partly leaked to the microphone path), is fed to a normalization unit (NOR) for providing normalized values of the ratio (e.g. in the range between 0 and 1), signal NRa(M-FB). The normalized signal NRa(M-FB) is fed to an averaging unit (AVG) for providing a normalized time average near end statistics. The output of the normalization unit (NOR) is fed to an averaging unit ($EMA_{NRa}$) for making a time average of the normalized signal NRa(M-FB), here also assumed to be an exponential moving average (e.g. implemented using an IIR-filter). The resulting time averaged signal EM(NRa) is fed to averaging unit (AVG(f)), which averages the input signal over frequency and provides the resulting (near end statistic) band signal $R(M-FB)_{WB}$ of the near end detector (MSP-D), which is fed to the processing unit (COMP). The averaging unit AVG(f) may operate on the full frequency range of operation of the communication device (e.g. between 20 Hz and 8 kHz). Alternatively, the averaging unit AVG(f) may operate on one or more selected frequency ranges, e.g. including a frequency range, where feedback (echo) is assumed not to be prevalent, e.g. between 200 Hz and 2.5 kHz. In an embodiment, signal values at a given frequency are weighted relatively lower in the averaging unit AVG(f) the larger the feedback component, and correspondingly weighted relatively higher the lower the feedback component.

The far end detector (SSP-D) comprises, in addition to the ABS-unit ($ABS_{SP}$) and the time averaging unit ($EMA_{SP}$), a gain adjustment unit ($GADJ_{SP}$) to correct the signal for the analogue gain applied by a frontend gain unit (cf. e.g. FEG in FIG. 12A) providing gain adjusted signal GA(SP) and a distortion correction unit (DCOR) for correcting the signal by an estimate of the harmonic distortion introduced by the speaker providing distortion corrected signal DC(SP). The (gain and) distortion corrected signal DC(SP) is fed to the time averaging unit $EMA_{SP}$ providing resulting enhanced signal EM(SP) (far end statistic) of the far end detector (SSP-D). The resulting enhanced signal EM(SP) of the speaker signal path detector (SSP-D) is fed to the processing unit (COMP).

The processing unit (COMP) comprises (configurable) threshold definition units ($SSP_{TH}$) and ($MSP_{TH}$) for the speaker signal path and the microphone signal path, respectively. In the respective threshold definition units, threshold values are defined to appropriately group the values of the respective input signals EM(SP) (far end statistics) and R(M-FB (near end statistics) between a minimum value (e.g. 0) and a maximum value (e.g. 1, if both statistics are normalized). The input signals EM(SP) and R(M-FB are allocated a range between neighboring threshold values in the respective threshold definition units ($SSP_{TH}$) and ($MSP_{TH}$). A resulting double talk indicator (signal D-TLK) is determined in comparison unit (CMP), e.g. from a look-up table, e.g. comprising as rows the ranges of EM(SP) (far end statistics) and as columns the ranges of R(M-FB (near end statistics) given by the configurable threshold values. An appropriate value of the double talk indicator (at a given point in time for a given frequency range) is extracted from the lookup table according to a predefined rationale. The predefined rationale may e.g. be determined in advance of the use of the doubletalk detector in a particular communication device and in specific (relevant) acoustic situations, e.g. based on speech intelligibility criteria or on a sound quality criteria, etc.

The embodiment of FIG. 13 is particularly valuable in applications or in acoustic environments where a per band near end detector value is NOT robust enough towards noise and echo residuals.

So to sum up, a simple rationale for determining a (binary or non-binary) double talk indicator (D-TLK) is: When both the near end statistic and the far end statistic are high, double talk is detected. When either of the statistics are low, double talk is not detected. Using the threshold values defined by the threshold definition units ($SSP_{TH}$) and ($MSP_{TH}$), non-binary values of the double talk indicator (D-TLK) may be defined.

The function of the doubletalk detector or a method of detecting double talk in a communication device according to the present disclosure includes the following:

For the near end detector (MSP-D):
1) The absolute value of the time-averaged value of each band is taken for the filtered speaker signal (e.g. represented by the estimated feedback signal) (F) and the raw microphone signal (M)
2) These are divided, D=M/F
3) Basically, if D>1.0, near end speech is assumed to be present.
4) Some transforms (normalization) may be applied to D, to make a value in the interval [0.0; 1.0] in each band; used for indicating near end speech to the algorithms later in the chain.
5) An interval of bands are integrated, to get a near end statistic that is more robust to noise.

This results in a single, system wide near end speech statistic.

For the far end detector (SSP-D):
1) The absolute value of the speaker signal (X) is taken in each band
2) Each band is corrected for the front end gain setting of the system (DAC gain, user volume regulation)
3) This results in a far end statistic in each band For the processing unit for identifying double talk (COMP):
1) For each band, double talk is detected, if the far end statistic is high in that band, and the global near end statistic is high.

All these statistics are advantageously implemented as continuous values in the interval [0.0; 1.0].

In the embodiments of a doubletalk detector shown in FIGS. 12 and 13, an input to the near end detector (MSP-D) is a feedback path estimate FBest (indicative of a signal in the microphone signal path that has 'survived' and been 'colored' by the feedback path from speaker to microphone. This is preferable in a steady state situation. In case of a dynamic acoustic situation (e.g. a transition from one steady state to another), it might, however, be preferable to use the output signal S-OUT to the speaker (SPK) directly instead. In an embodiment, both inputs are provided to the doubletalk detector and considered in the evaluation of the near end statistic (signal R(M-FB)). In an embodiment, an input providing a classification of the current acoustic environment is provided to the doubletalk detector. In an embodiment, the doubletalk detector is configured to use the feedback path estimate FBest as input to the determination of the near end statistics, if the classification input indicates a relatively stable acoustic environment, and to use the output signal S-OUT to the speaker as input to the determination of the near end statistics, if the classification input indicates a transient acoustic environment.

The doubletalk detector described above may be used in the context of the communication device of the present disclosure, or in any other communication device comprising separate incoming (far end) and outgoing (near end) communication channels, e.g. telecommunication devices, where the problem of double talk (the presence of simultaneous audio signals, e.g. speech, in both channels) may be relevant.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims and equivalents thereof.

REFERENCES

U.S. Pat. No. 3,622,714 (BELL TELEPHONE LABORATORIES) 23 Nov. 1971
WO 2007/006658 A1 (OTICON) 18 Jan. 2007
EP 1367566 A2 (CODING TECHNOLOGIES) 3 Dec. 2003.
B. C. J. Moore, 'An Introduction to the Psychology of Hearing', Elsevier Academic Press, 2004

The invention claimed is:
1. A communication device comprising:
a microphone signal path (MSP), the microphone signal path comprising a microphone unit, an MSP-signal processing unit comprising an MSP-filter having configurable filtering characteristics, and a transmitter unit operationally connected to each other and configured to transmit a processed signal originating from an input sound picked up by the microphone;
a loudspeaker signal path (SSP), said loudspeaker signal path comprising a receiver unit, an SSP-signal processing unit comprising an SSP-filter having configurable filtering characteristics, and a loudspeaker unit opera- tionally connected to each other and configured to provide an acoustic sound signal originating from a signal received by the receiver unit; and a control unit for dynamically controlling the configurable filtering characteristics of the MSP-filter and the configurable filtering characteristics of the SSP-filter, wherein the control unit dynamically controls the configurable filtering characteristics of the MSP-filter and the SSP-filter based on one or more control input signals dependent of a property of a signal of the microphone signal path and/or a signal of the loudspeaker signal path, and the control unit dynamically controls the configurable filtering characteristics of the MSP-filter and the SSP-filter while keeping the MSP-filter characteristics complementary to the SSP-filter characteristics such that the SSP-filter is configured to pass a first subset of frequency bands and either block or attenuate a second set of frequency bands while the MSP-filter is simultaneously configured to pass the second set of frequency bands and block or attenuate the first set of frequency bands.

2. A communication device according to claim 1, wherein the microphone signal path and the loudspeaker signal path each comprises an analysis filter bank for converting a time domain input signal to a number of time varying signals in the frequency domain.

3. A communication device according to claim 1, wherein the MSP-filter and SSP-filter are digital filters each comprising a number of passbands $PB_i$ centered around predefined pass-band center frequencies $fPB_{c,i}$, $i=1, 2, \ldots, NPB$, the passbands being separated by stopbands $SB_j$ centered around predefined stop-band center frequencies $fSB_{c,j}$, $j=1, 2, \ldots, NSB$, where NPB and NSB are the number of passbands and stopbands, respectively.

4. A communication device according to claim 1, wherein the MSP-signal processing unit comprises a synthesizing unit for providing signal content at frequencies of the signal of the MSP-signal path filtered out by the MSP-filter.

5. A communication device according to claim 4, wherein the synthesizing unit is configured to provide an interpolation of the envelope between open bands or to use bandwidth extension in order to retain approximately the same signal power level as before filtering.

6. A communication device according to claim 1, wherein said property is related to the frequency spectrum of the MSP signal and/or the frequency spectrum of the SSP signal.

7. A communication device according to claim 1, wherein the SSP-signal processing unit comprises a gain unit for compensating the energy content filtered out of the signal by the SSP-filter.

8. A communication device according to claim 1, comprising a feedback path estimation unit for estimating properties of the feedback path from the loudspeaker unit to the microphone unit.

9. A communication device according to claim 1, wherein the control unit comprises a doubletalk detector for detecting a situation where users at each end talk simultaneously and for providing a control signal indicative of that fact.

10. A communication device according to claim 9, wherein the control signal from said doubletalk detector is determined from a change over time of the energy content of the feedback path from the loudspeaker to the microphone of the communication device.

11. A communication device according to claim 9, wherein the control signal from the doubletalk detector is determined from a comparison of a) the current energy of the far end signal represented by the energy content of the feedback path from the loudspeaker to the microphone of the communication device with b) the current energy content of the near end signal taken in relation to the current energy in the far end signal represented by the energy content microphone input signal and energy content of the speaker signal or filtered speaker signal.

12. A communication device according to claim 9, wherein the control signal from the doubletalk detector is determined from a comparison of a) the current energy of the far end signal represented by the energy content of the loudspeaker signal with b) the current energy content of b1) the near end signal represented by the energy content microphone input signal taken in relation to b2) the current energy in the far end signal represented by the energy content of the speaker signal or an estimate of the speaker signal filtered through the feedback path from the loudspeaker to the microphone.

13. A communication device according to claim 1, wherein the control unit is configured to activate or de-activate a specific echo suppression mode of operation of the communication device.

14. A communication device according to claim 13, wherein the activation or de-activation of the echo suppression mode is determined based on an indication of the amount of double talk detected, and wherein the control unit is configured for dynamically controlling the filtering characteristics of the MSP and SSP-filters based on the current amount of double talk.

15. A communication device according to claim 1, wherein the microphone signal path comprises a squelch unit for limiting a signal of the microphone signal path in dependence of a signal level in the speaker signal path.

16. A communication device according to claim 1, comprising at least one wired or wireless audio interface to another device, said other devices being capable of receiving as well as forwarding audio signals.

17. A communication device according to claim 1, comprising at least one audio interface to a network capable or exchanging audio signals between the communication device and another communication device.

18. A communication device according to claim 1, wherein the loudspeaker signal path of the communication device comprises a mixer configured for mixing audio signals received from another audio communication device via a wired or wireless network interface and/or via another wired or wireless audio interface associated with the communication device.

19. A communication device according to claim 1, comprising a speakerphone.

20. A method operating a communication device, the communication device comprising: a microphone signal path (MSP), the microphone signal path comprising a microphone unit, an MSP-signal processing unit comprising an MSP-filter having configurable filtering characteristics, and a transmitter unit operationally connected to each other and configured to transmit a processed signal originating from an input sound picked up by the microphone; a loudspeaker signal path (SSP), the loudspeaker signal path comprising a receiver unit, an SSP-signal processing unit comprising an SSP-filter, and a loudspeaker unit operationally connected to each other and configured to provide an acoustic signal originating from a signal received by the receiver unit, the method comprising:

providing configurable filtering characteristics for the MSP-filter and the SSP-filter; and dynamically controlling the configurable filtering characteristics of the MSP and SSP-filters based on one or more control input signals dependent of a property of a signal of the microphone signal path and/or a signal of the loudspeaker signal path, wherein said step of dynamically controlling controls the configurable filtering characteristics of the MSP-filter and the SSP-filter while keeping the MSP-filter characteristics complementary to the SSP-filter characteristics such that the SSP-filter is configured to pass a first subset of frequency bands and either block or attenuate a second set of frequency bands while the MSP-filter is simultaneously configured to pass the second set of frequency bands and block or attenuate the first set of frequency bands.

21. A data processing system comprising a processor and program code stored on non-transitory computer-readable medium for causing the processor to perform the steps of the method of claim 20.

* * * * *